United States Patent
Lee et al.

(10) Patent No.: US 8,000,422 B2
(45) Date of Patent: Aug. 16, 2011

(54) APPARATUS AND METHOD FOR DETECTING SIGNAL IN MULTIPLE-INPUT MULTIPLE-OUTPUT (MIMO) WIRELESS COMMUNICATION SYSTEM

(75) Inventors: Joo-Hyun Lee, Suwon-si (KR); Sang-Boh Yun, Seongnam-si (KR); Young-Hoon Kwon, Seongnam-si (KR); Soong-Yoon Choi, Suwon-si (KR); Yong-Soo Cho, Seoul-si (KR); Tae-Ho Im, Seoul-si (KR); Jae-Kwon Kim, Wonju-si (KR)

(73) Assignees: Samsung Electronics Co., Ltd., Suwon-si (KR); Chung-Ang University Industry-Academy Cooperation, Seoul-Si (KR)

( * ) Notice: Subject to any disclaimer, the term of this patent is extended or adjusted under 35 U.S.C. 154(b) by 653 days.

(21) Appl. No.: 12/157,679

(22) Filed: Jun. 12, 2008

(65) Prior Publication Data

US 2008/0310556 A1 Dec. 18, 2008

(30) Foreign Application Priority Data

Jun. 12, 2007 (KR) .................. 10-2007-0057234
Jun. 10, 2008 (KR) .................. 10-2008-0054064

(51) Int. Cl.
*H04B 1/10* (2006.01)

(52) U.S. Cl. .................. 375/349; 375/347; 375/267
(58) Field of Classification Search .................. 375/262, 375/267, 316, 347, 349, 341
See application file for complete search history.

(56) References Cited

U.S. PATENT DOCUMENTS

2008/0240277 A1* 10/2008 Anholt et al. .................. 375/262
2008/0279299 A1* 11/2008 Reuven et al. .................. 375/267

* cited by examiner

*Primary Examiner* — Emmanuel Bayard

(57) ABSTRACT

Receiving apparatus and method in a Multiple-Input Multiple-Output (MIMO) wireless communication system are provided. The receiver having N-ary receive antennas includes a decomposer for decomposing a channel matrix to a matrix Q and a matrix R through a QR decomposition; a detector for determining a candidate group of an n-th phase by estimating a plurality of transmit signal vectors by substituting a plurality of transmittable symbols into symbol combinations of a candidate group of a (n−1)-th phase as an n-th symbol and detecting (n+1)-th through N-th symbols using characteristics of the matrix R; a calculator for calculating square Euclidean distance values between the transmit signal vectors and a receive signal vector; and a determiner for determining the candidate group of the n-th phase by selecting transmit signal vectors having the smallest square Euclidean distance value among the transmit signal vectors.

32 Claims, 14 Drawing Sheets

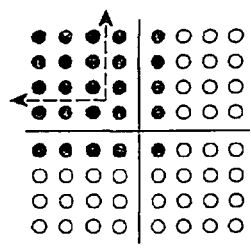 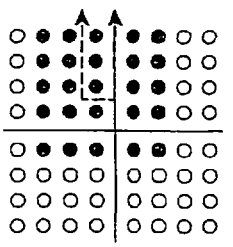 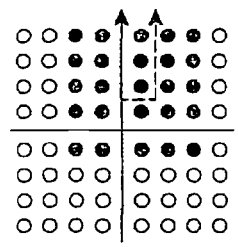 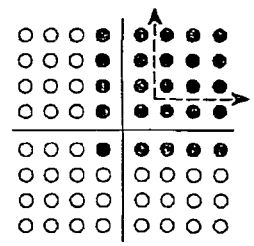
FIG.9A  FIG.9B  FIG.9C  FIG.9D
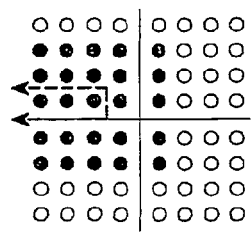 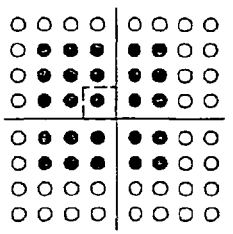 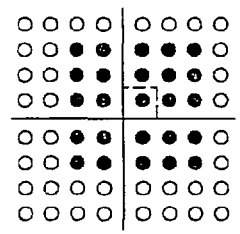 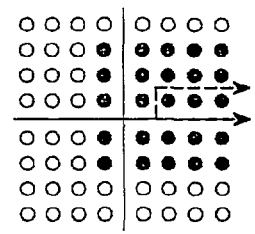
FIG.9E  FIG.9F  FIG.9G  FIG.9H
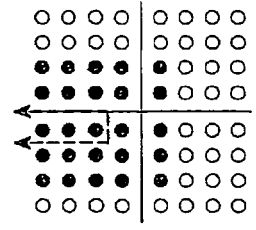 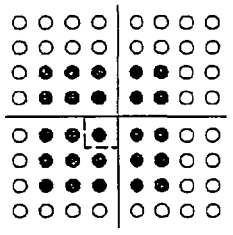 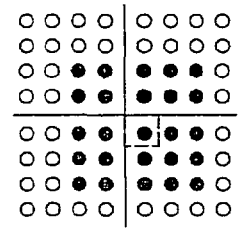 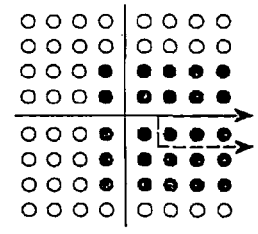
FIG.9I  FIG.9J  FIG.9K  FIG.9L
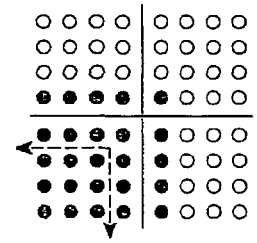 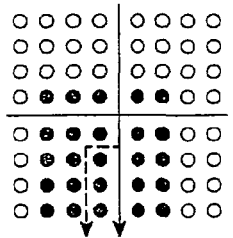 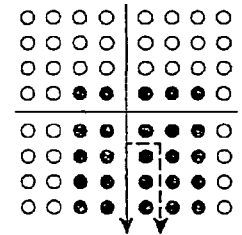 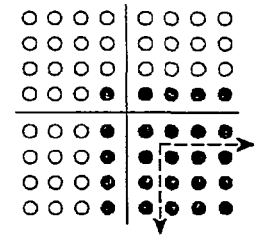
FIG.9M  FIG.9N  FIG.9O  FIG.9P
 : AREA OF THE TEMPORARILY ESTIMATED SOFT VALUE      : SUBSTITUTE SYMBOL

APPARATUS AND METHOD FOR DETECTING SIGNAL IN MULTIPLE-INPUT MULTIPLE-OUTPUT (MIMO) WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Jun. 12, 2007 and assigned Serial No. 2007-57234, and an application filed in the Korean Intellectual Property Office on Jun. 10, 2008 and allocated Serial No. 2008-54064. The entire disclosures of both applications are hereby incorporated by reference.

TECHNICAL FIELD OF THE INVENTION

The present invention relates generally to a receiving apparatus and method in a Multiple-Input Multiple-Output (MIMO) wireless communication system. More particularly, the present invention relates to an apparatus and a method for detecting a signal with a performance similar to a Maximum Likelihood (ML) and with a low complexity in a MIMO wireless communication system using a Spatial Multiplexing (SM) scheme.

BACKGROUND OF THE INVENTION

Recent rapid growth of the wireless mobile communication market created demands for various multimedia services in a radio environment. In particular, the demand required massive data to be transmitted at a high data rate. The most urgent task is to find a method for efficiently utilizing limited radio resources. To this end, a new transmission technique using multiple antennas is introduced. For example, a Multiple-Input Multiple-Output (MIMO) technology using multiple antennas is under consideration. The MIMO technology employs multiple antennas in a transmitter and a receiver each. Compared to a single-antenna system, the MIMO can increase a channel transmission capacity in proportion to the number of the antennas without additional frequency or additional transmit power allocation, which is why the MIMO is attracting much attention.

The MIMO technology largely includes a spatial diversity scheme which raises transmission reliability by acquiring a diversity gain equal to a product of the number of pairs of transmit antennas and receive antennas, a spatial multiplexing scheme which raises a data rate by transmitting multiple signal streams at the same time, and a combination scheme of the spatial diversity and the spatial multiplexing.

As the transmitter transmits different information over the multiple transmit antennas, the spatial multiplexing scheme can achieve a rapid data transmission. Since the multiple transmit antennas transmit the different signals at the same time, the receive antennas of the receiver receive a signal of all the transmit signals. Accordingly, the receiver needs to separate the multiplexed signals on the basis of the antenna. To detect the antenna signals, the receiver of the spatial multiplexing system can adopt a Zero-Forcing (ZF), a Minimum Mean Square Error (MMSE), an Order Successive Interference Cancellation (OSIC), and so on.

The ZF and the MMSE, which are linear signal detection methods, can be implemented in a simpler structure due to low computational complexity but can not provide good performance. The OSIC detects a signal by eliminating the detected signals from the received signal in a preset detection order. The OSIC scheme requires higher computational complexity than the linear signal detection methods but features better performance than the linear signal detection methods. Even so, the performance of the OSIC method is lower than that of a Maximum Likelihood (ML) method which exhibits optimum performance.

The ML method takes into account all transmittable signal vectors and selects a signal vector having a minimum square Euclidean distance to the receive signal. The ML method, which is an optimum solution, is a basis for comparing the performance with the other methods. However, as the number of the transmit antennas and the modulation order increase, the computational complexity of the ML method exponentially increases as well. Thus, it is difficult to apply the ML method to a substantial system.

A sphere decoding method, which is a signal detection method, exhibits performance similar to the ML method. However, it is hard to obtain a radius of the initial sphere and implement the sphere decoding method because too much computation is required at the worst case. The performance of a QR Decomposition-M (QRD-M) method greatly depends on the number of candidate groups. Given a sufficient number of the candidate groups, the QRD-M scheme exhibits performance substantially similar to the ML method. With a small number of candidate groups, its performance drastically degrades. In addition, a larger number of candidate groups raises the computational complexity.

In the receiver using the spatial multiplexing scheme, it is known that it is advantageous to provide to a decoder and decode a soft-decision value in terms of the performance, rather than providing and decoding a hard-decision value of the coded bits. The soft-decision value input to the decoder is an estimate value of modulation symbols transmitted over the channel. The soft-decision value uses a Log Likelihood Ratio (LLR) value. Accordingly, the receiver of the spatial multiplexing requires not only a reception algorithm of low complexity but also an algorithm for calculating an optimum LLR based on the corresponding reception algorithm.

To calculate the LLR, the ZF and the MMSE of the linear signal detection methods and the OSIC of the non-linear signal detection methods require computations for calculating the square Euclidean distance. The sphere decoding method needs many candidate groups of the detected signal to achieve sufficient performance enhancement and suffers from high computational complexity in calculating the square Euclidean distances of the candidate groups. The QRD-M method is subject to the unavailable probability value in the LLR calculation because there are no corresponding bits in the candidate group in the probability of 0 and the probability of 1 for each bit.

As discussed above, the suggested signal detection methods for the spatial multiplexing are subject to various problems. Therefore, what is needed is a method for achieving a performance similar to the optimum performance of the ML method, while lowering the computational complexity and efficiently generating the LLR for the soft decision of the decoder.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for detecting a signal with a low complexity and a performance similar to an ML method in a MIMO wireless communication system using a Spatial Multiplexing (SM) scheme.

Another aspect of the present invention is to provide an apparatus and a method for effectively generating per bit LLRs in a MIMO wireless communication system using an SM scheme.

Yet another aspect of the present invention is to provide an apparatus and a method for substituting transmittable symbols per phase and detecting signals in sequence in a MIMO wireless communication system using an SM scheme.

Still another aspect of the present invention is to provide an apparatus and a method for lowering a computational complexity of a signal detection by limiting the number of symbols substituted in each phase in a MIMO wireless communication system using an SM scheme.

A further aspect of the present invention is to provide an apparatus and a method for enhancing a performance of a signal detection by replacing symbols estimated in each phase with symbols closer to the actual transmit signal in a MIMO wireless communication system using an SM scheme.

Yet a further aspect of the present invention is to provide an apparatus and a method for lowering a computational complexity by reducing the number of transmittable symbols per phase in a MIMO wireless communication system using an SM scheme.

The above aspects are achieved by providing a receiver comprising N-ary receive antennas in a MIMO wireless communication system. The receiver includes a decomposer for decomposing a channel matrix to a matrix Q and a matrix R through a QR decomposition; a detector for determining a candidate group of an n-th phase, estimating a plurality of transmit signal vectors by substituting a plurality of transmittable symbols into symbol combinations of a candidate group of a (n−1)-th phase as an n-th symbol and detecting (n+1)-th through N-th symbols using characteristics of the matrix R; a calculator for calculating square Euclidean distance values between the transmit signal vectors and a receive signal vector; and a determiner for determining the candidate group of the n-th phase by selecting transmit signal vectors having the smallest square Euclidean distance value among the transmit signal vectors.

According to one aspect of the present invention, a signal detecting method of a receiver which comprises N-ary receive antennas in a MIMO wireless communication system, includes decomposing a channel matrix to a matrix Q and a matrix R through a QR decomposition; determining a candidate group of an n-th phase by estimating a plurality of transmit signal vectors by substituting a plurality of transmittable symbols into symbol combinations of a candidate group of a (n−1)-th phase as an n-th symbol with respect to first through (n−1)-th symbols and detecting (n+1)-th through N-th symbols using characteristics of the matrix R; calculating square Euclidean distance values between the transmit signal vectors and a receive signal vector; and determining the candidate group of the n-th phase for the first through n-th symbols by selecting transmit signal vectors having the smallest square Euclidean distance value among the transmit signal vectors.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 9A to 9P illustrate a constellation limitation in the MIMO wireless communication system according to an exemplary embodiment of the present invention;

DETAILED DESCRIPTION OF THE INVENTION

Figure 1A:
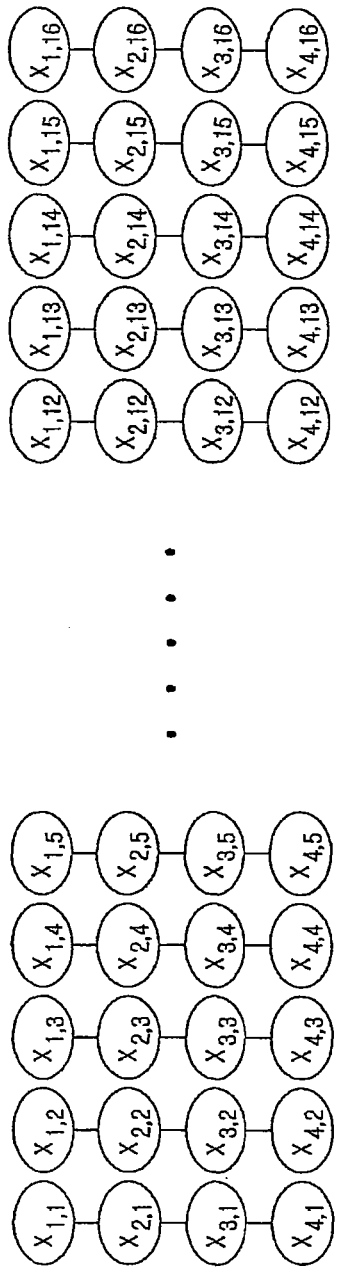
FIGS. 1A to 1D illustrate a transmit symbol selection in a MIMO system according to an exemplary embodiment of the present invention.

FIGS. 1A through 10B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a signal detecting technique with low complexity and performance similar to a Maximum Likelihood (ML) method in a Multiple-Input Multiple-Output (MIMO) wireless communication system using a Spatial Multiplexing (SM) scheme.

A channel, a transmit signal, and a receive signal between a transmitter including m-ary transmit antennas and a receiver including n-ary receive antennas are expressed as Equation 1:

$$H = \begin{bmatrix} h_{11} & h_{12} & \ldots & h_{1m} \\ h_{21} & h_{22} & \ldots & h_{2m} \\ \vdots & \vdots & \ddots & \vdots \\ h_{n1} & h_{n2} & \ldots & h_{nm} \end{bmatrix}$$ [Eqn. 1]

$$y = Hx + n$$

$$y = [y_1 \; y_2 \; \ldots \; y_n]^T$$

$$x = [x_1 \; x_2 \; \ldots \; x_m]^T$$

$$n = [n_1 \; n_2 \; \ldots \; n_n]^T.$$

In Equation 1, $x_j$ denotes a transmit signal of the j-th transmit antenna, $y_i$ denotes a receive signal of the i-th receive antenna, $h_{ij}$ denotes a channel coefficient between the j-th transmit antenna and the i-th receive antenna, and $n_i$ denotes an additive noise of the i-th receive antenna.

In the MIMO wireless communication system using the SM scheme, according to the ML scheme for detecting a signal with an optimum performance, the receiver calculates square Euclidean distances between all the signal vectors and the receive signal vector and determines the signal vector of a minimum square Euclidean distance as a transmit signal vector. When the channel, the transmit signal, and the receive signal are expressed as Equation 1, the ML scheme can be expressed as Equation 2:

$$x_{ML} = \text{argmax} P(y|x)$$ [Eqn. 2]

$$= \text{argmax} \|y - Hx\|^2.$$

In Equation 2, $x_{ML}$ denotes the transmit signal vector detected using the ML scheme, P(y|x) denotes a conditional probability of the receive signal y, given the transmit signal x, x denotes the transmit signal vector, y denotes the receive signal vector, and H denotes a channel matrix.

When there are four transmit antennas and four receive antennas and symbols modulated using a 16-Quadrature Amplitude Modulation (QAM) are detected using the ML scheme as expressed in Equation 2, the receiver needs to compute the square Euclidean distance for $16^4$ times. Namely, the computation of the ML scheme exponentially increases according to the number of the transmit antennas.

Linear schemes requiring less computation than the ML scheme include a Zero Forcing (ZF) scheme and a Minimum Mean Square Error (MMSE) scheme. The ZF scheme features simplicity in calculating a reverse function of the channel but suffers from noise amplification. The MMSE scheme exhibits a better performance than the ZF scheme by mitigating the noise amplification of the ZF scheme. Notably, the ZF scheme and the MMSE scheme have far lower performance than the ML scheme. The ZF scheme can be expressed as Equation 3 and the MMSE scheme can be expressed as Equation 4:

$$y = H^+(Hx+n), \; H^+ = (H^*H)^{-1}H^*.$$ [Eqn. 3]

In Equation 3, H denotes the channel matrix, x denotes the transmit signal vector, n denotes the noise, $H^+$ denotes a pseudo reverse matrix of the channel matrix, and $H^*$ denotes a conjugate transpose matrix of the channel matrix.

$$y = W(Hx+n), \; W = (H^*H + \sigma^2 I_M)^{-1} H^*.$$ [Eqn. 4]

In Equation 4, H denotes the channel matrix, x denotes the transmit signal vector, n denotes the noise, $H^*$ denotes a conjugate transpose matrix, $\sigma^2$ denotes a power of the noise, and $I_M$ denotes a unit matrix of the size M.

In brief, the ZF scheme nulls an interference signal by computing the pseudo reverse matrix of the channel response without considering the noise, and the MMSE scheme makes the demodulated signal have a maximum Signal to Noise Ratio (SNR) by taking into account the noise.

Now, a MIMO signal detecting method having performance similar to the ML scheme and much lower computational complexity is explained. It is assumed that the transmitter and the receiver include four transmit antennas and four receive antennas respectively. The present invention is applicable to any transmitter and any receiver including a different number of antennas.

First of all, a basic idea of the present invention is described by referring to FIGS. 1A to 1D. It is assumed that the number of symbol combinations in the candidate group of each phase is three and the modulation order is 16.

The receiver receives transmit signals from four transmit antennas via four receive antennas. The receiver needs to detect one transmit signal from the four receive antennas.

The receiver arranges columns of the channel matrix according to an SNR of the receive antennas so as to detect a signal received on the receive antenna of good channel condition. For instance, the receiver arranges the columns of the channel matrix based on the size of a norm value of each column. Thus, the receiver can detect the transmit signals in the arranged order. Hereafter, four symbols are referred to as $x_1$, $x_2$, $x_3$, and $x_4$ in the order of the detection.

The receiver QR-decomposes the arranged channel matrix as in Equation 5:

$$y = Hx + n = QRx + n$$

$$Q^H Q = I, \; R = \begin{bmatrix} r_{1,1} & r_{1,2} & r_{1,3} & r_{1,4} \\ 0 & r_{2,2} & r_{2,3} & r_{2,4} \\ 0 & 0 & r_{3,3} & r_{3,4} \\ 0 & 0 & 0 & r_{4,4} \end{bmatrix}.$$ [Eqn. 5]

In Equation 5, y denotes the receive signal vector, H denotes the channel matrix, x denotes the transmit signal vector, and n denotes the noise vector. Q denotes a matrix which becomes a unit matrix after multiplying by its Hermitian matrix. R denotes an upper triangular matrix which becomes the channel matrix by multiplying by the matrix Q.

To detect the signal using the characteristics of the matrix R, the receiver transforms the receive signal into a form to ease the cancellation of the inter-antenna interference by multiplying the receive signal by $Q^H$ as expressed in Equation 6:

$$Q^H y = Rx + Q^H n$$

$$y' = Rx + n'$$

$$\begin{bmatrix} y'_4 \\ y'_3 \\ y'_2 \\ y'_1 \end{bmatrix} = \begin{bmatrix} r_{1,1} & r_{1,2} & r_{1,3} & r_{1,4} \\ 0 & r_{2,2} & r_{2,3} & r_{2,4} \\ 0 & 0 & r_{3,3} & r_{3,4} \\ 0 & 0 & 0 & r_{4,4} \end{bmatrix} \begin{bmatrix} x_4 \\ x_3 \\ x_2 \\ x_1 \end{bmatrix} + \begin{bmatrix} n'_4 \\ n'_3 \\ n'_2 \\ n'_1 \end{bmatrix}.$$ [Eqn. 6]

In Equation 6, Q denotes a matrix acquired by QR-decomposing the channel matrix H, y denotes the received signal vector, R denotes an upper triangular matrix acquired by QR-decomposing the channel matrix H, x denotes the transmit signal vector, and n denotes the noise vector.

The receiver estimates the transmit signal vectors based on all the transmittable $x_1$, i.e., based on $x_{1,1}$ through $x_{1,16}$ as shown in FIG. 1A. More specifically, provided that $x_1$ is transmittable 16 symbols, the receiver estimates 16 transmit signal vectors. $x_2$, $x_3$, and $x_4$ are estimated using a QR Decomposition-Order Successive Interference Cancellation (QRD-OSIC) scheme, which will be described in further detail. Next, the receiver determines $x_1$ candidate groups, i.e., determining candidate groups of the first phase by selecting 3 transmit signal vectors from the 16 transmit signal vectors. The receiver calculates the square Euclidean distance between the 16 transmit signal vectors and the receive signal vector, and selects 3 transmit signal vectors having the smallest square Euclidean distance value. The receiver calculates a per bit Log Likelihood Ratio (LLR) of $x_1$ using the 16 square Euclidean distances acquired from the 16 transmit signal vectors.

Figure 1B:
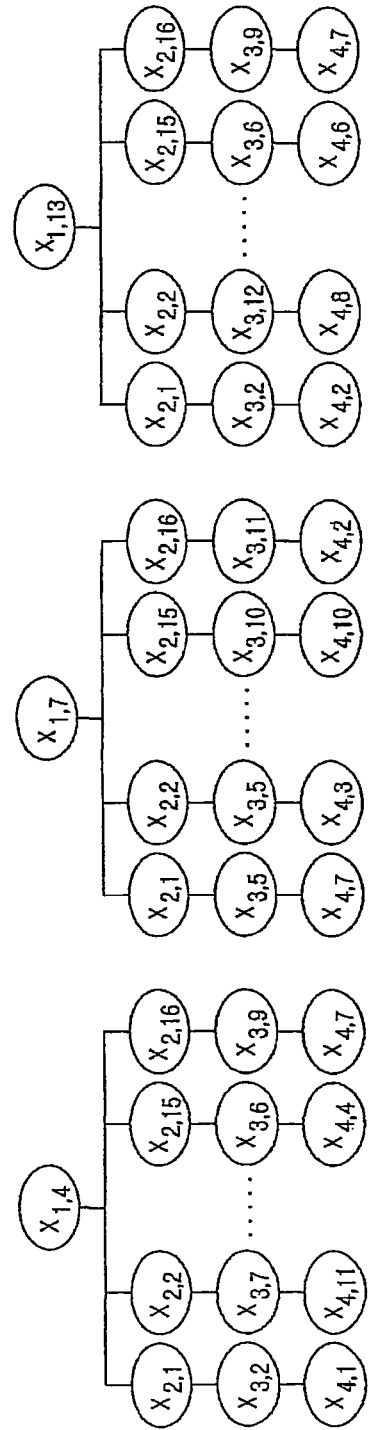

In FIG. 1B, the receiver estimates the other transmit signals by substituting all the transmittable $x_2$, i.e., substituting $x_{2,1}$ through $x_{2,16}$ into the 3 selected $x_1$ candidate groups among the 16 transmit signal vectors of FIG. 1A. The number of the estimated transmit signal vectors is 16 per transmittable $x_2$ in each of the 3 $x_1$ candidates, i.e., 48. The receiver calculates and updates per bit LLRs of $x_1$ and $x_2$ using 48 square Euclidean distances obtained from the 48 transmit signal vectors and the 16 square Euclidean distances of FIG. 1A. Hence, the per bit LLR of $x_1$ is updated and the per bit LLR of $x_2$ is newly acquired. With the 16 transmit signal vectors estimated in FIG. 1A and the 48 transmit signal vectors estimated in FIG. 1B, the square Euclidean distances of the 61 transmit signal vectors, excluding the overlapping transmit signal vectors, are used to calculate the LLR. The receiver determines candidate groups of $x_1$-$x_2$, i.e., determines candidate groups of the second phase by selecting 3 transmit signal vectors having the smallest square Euclidean distances amongst the 48 transmit signal vectors.

Figure 1C:
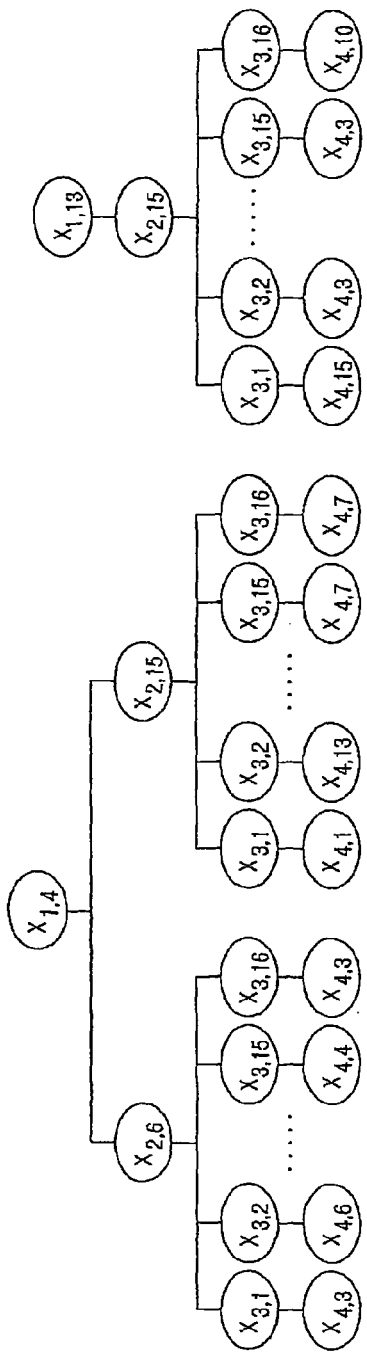

In FIG. 1C, the receiver estimates the remaining transmit symbols by substituting the transmittable $x_3$; i.e., substituting $x_{3,1}$ through $x_{3,16}$ into the 3 $x_1$-$x_2$ candidate groups selected from the 48 transmit signal vectors of FIG. 1B. The number of the estimated transmit signal vectors is 16 transmittable $x_3$, i.e., 48 for the 3 $x_1$ and $x_2$ combinations. The receiver calculates and updates the per bit LLRs of $x_1$, $x_2$, and $x_3$ using the square Euclidean distances of the 106 transmit signal vectors including the 48 transmit signal vectors, the 16 transmit signal vectors of FIG. 1A, and the 48 transmit signal vectors estimated in FIG. 1B. Thus, the per bit LLRs of $x_1$ and $x_2$ are updated, and the per bit LLR of $x_3$ is acquired. By selecting 3 transmit signal vectors having the smallest square Euclidean distance value from the receive signal amongst the 48 transmit signal vectors, the receiver determines candidate groups of $x_1$-$x_2$-$x_3$, i.e., candidate groups of the third phase.

Figure 1D:
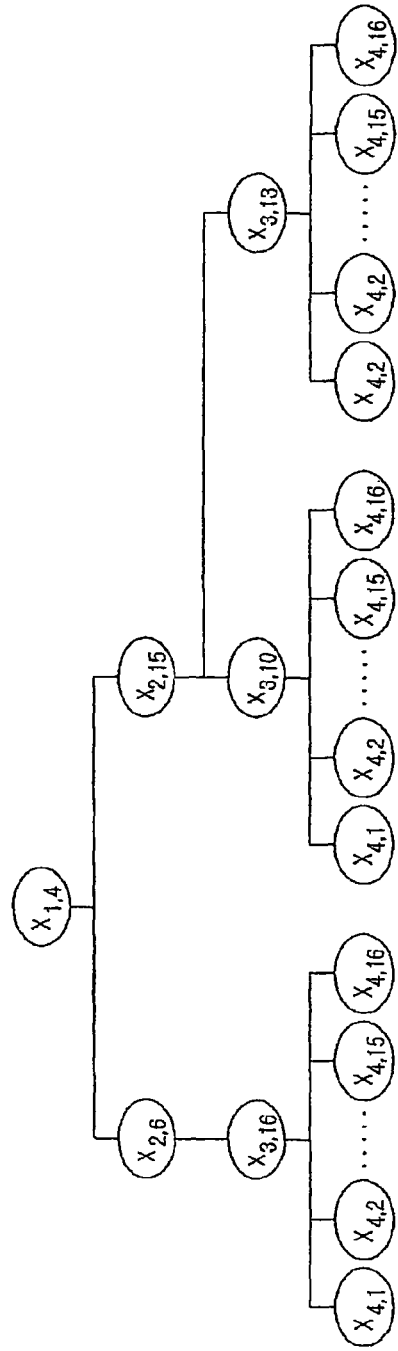

In FIG. 1D, the receiver substitutes all the transmittable $x_4$, i.e., substituting $x_{4,1}$ through $x_{4,16}$ into the three $x_1$-$x_2$-$x_3$ candidate groups selected from the 48 transmit signal vectors of FIG. 1C. Accordingly, the transmit signal vectors are 16 $x_4$ for each of the 3 $x_1$, $x_2$, and $x_3$ combinations, i.e., 48 in total. The receiver calculates and updates the per bit LLRs of $x_1$, $x_2$, $x_3$, and $x_4$ using the square Euclidean distances of the 151 transmit signal vectors including the 48 transmit signal vectors, the 16 transmit signal vectors estimated in FIG. 1A, the 48 transmit signal vectors estimated in FIG. 1B, and the 48 transmit signal vectors estimated in FIG. 1C. In this phase, the per bit LLRs of $x_1$, $x_2$, and $x_3$ are updated, and the per bit LLR of $x_4$ is acquired.

Next, the receiver performs a soft decision decoding using the LLRs of the receive bits. For a hard decision decoding, the receiver uses the transmit signal vector of the smallest square Euclidean distance value from the receive signal among the 48 transmit signal vectors of FIG. 1D.

When determining the candidate groups for the phases in FIGS. 1A to 1D, the receiver substitutes all the transmittable symbols of the corresponding phase into the symbol combinations of the candidate group determined in the previous phase and then estimates the other signals. Using 16-QAM, the consideration on all the transmittable symbols is not so difficult in terms of the computation. By contrast, using 64-QAM, all the transmittable symbols cause quite a computational burden. Therefore, the present invention also provides a method for further mitigating the computational complexity by estimating the remaining signals after substituting only some of the transmittable symbols in each phase.

To limit the signals to be substituted in each phase, the receiver temporarily estimates the transmit signal vector using the initial receive signal vector according to the ZF scheme or the MMSE scheme. According to the temporarily estimated symbol value in each phase, the receiver selects transmittable symbols to be used in the computations as shown in FIGS. 9A to 9P. In other words, the symbols to be substituted in each phase are determined in a preset pattern by temporarily estimating the transmit signal vector using the ZF scheme or the MMSE scheme. FIGS. 9A to 9P illustrate a limitation pattern using only 25 symbols in a 64-QAM constellation. There are 16 patterns as a result of the temporary estimation shown in FIGS. 9A to 9P. The receiver utilizes as the substitute symbols the symbols in a square centered at the point most adjacent to the soft decision value of the temporarily estimated symbol among squares including a preset number of transmittable symbols in the constellation of the modulation scheme of the transmit signal. For example, when the temporarily estimated symbol is positioned in an area indicated by the dotted line as shown in FIG. 9A, the limited candidate symbols are 25 symbols in the upper left side. The receiver substitutes only the 25 symbols and then estimates the other signals, without substituting all the transmittable symbols in the corresponding phase.

In the MIMO signal detection method afore-mentioned based on FIG. 1, the receiver selects three transmit signal vectors as the candidate group of each phase. A plurality of the transmit signal vectors is selected because the accuracy of the symbol estimation using the QRD-OSIC scheme using the properties of the QR decomposition is not fully reliable. In other words, even the transmit signal vector having the smallest square Euclidean distance to the receive signal vector amongst the transmit signal vectors estimated using the QRD-OSIC scheme can differ from the transmit signal vector estimated using the ML scheme. Thus, the present invention additionally provides a method for decreasing the number of candidate groups by replacing the symbols estimated using the QRD-OSIC scheme (the general MIMO sub-optimum scheme) with symbols closer to the actual transmit signals.

To replace the symbols estimated using the MIMO sub-optimum scheme with symbols closer to the transmit signal, the receiver removes the component of the symbols excluding the target symbol to be replaced from the receive signal vector. The receiver replaces the target symbol with another transmittable symbol so as to minimize a norm value of the subtraction of the component of the receive signal vector from which the component of the other symbols are removed and the component of the target symbol. Herein, the component of the symbol indicates a product of the estimated symbol and the column vector corresponding to the estimated symbol in the channel matrix. The above-mentioned symbol replacement can be expressed as Equation 7:

$$x'_j = \underset{x_j, x \in S}{\mathrm{argmin}} \left\| y - \sum_{i=1, i \neq j}^{m} h_i x_i - h_j x_j \right\|^2 \quad \text{[Eqn. 7]}$$

$$= \underset{x_j, x \in S}{\mathrm{argmin}} \left\| \frac{h_j^H}{\|h_j\|^2} \left( y - \sum_{i=1, i \neq j}^{m} h_i x_i - h_j x_j \right) \right\|^2$$

$$= \mathrm{slicer}\left( \frac{h_j^H}{\|h_j\|^2} \left( y - \sum_{i=1, i \neq j}^{m} h_i x_i \right) \right).$$

In Equation 7, $x'_j$ denotes the replaced symbol of the j-th symbol, y denotes the receive signal vector, m denotes the number of symbols, $h_i$ denotes the i-th column of the channel matrix, $h_j$ denotes the j-th column of the channel matrix, $x_j$ denotes the j-th transmit symbol, and slicer (•) denotes the slicing operator.

As expressed in Equation 7, the values of the other symbols are utilized to replace one symbol. In doing so, when there is a symbol replaced prior to the target symbol, the value of the pre-replaced symbol is used as the replaced value. For example, when $x_4$, $x_3$ and $x_2$ are replaced in that order, $x_1$, $x_2$ and $x_3$ are used for the replacement of $x_4$. For the replacement of $x_3$, the replaced $x'_4$, $x_1$ and $x_2$ are utilized. In this case, the replacement of the symbols is expressed as Equation 8:

$$x'_4 = \mathrm{slicer}\left( \frac{h_4^H}{\|h_4\|^2} (y - h_1 x_1 - h_2 x_2 - h_3 x_3) \right) \quad \text{[Eqn. 8]}$$

$$x'_3 = \mathrm{slicer}\left( \frac{h_3^H}{\|h_3\|^2} (y - h_1 x_1 - h_2 x_2 - h_4 x'_4) \right)$$

$$x'_2 = \mathrm{slicer}\left( \frac{h_2^H}{\|h_2\|^2} (y - h_1 x_1 - h_3 x'_3 - h_4 x'_4) \right).$$

In Equation 8, $x'_n$ denotes the replaced symbol of the n-th symbol, slicer (•) denotes the slicing operator, $h_j$ denotes the j-th column of the channel matrix, y denotes the receive signal vector, and $x_n$ denotes the n-th transmit symbol.

Equation 8 can be re-expressed as Equation 9 by using R matrix acquired by QR-decomposing the channel matrix:

$$x'_4 = \mathrm{slicer}\left( \frac{r_4^H}{\|r_4\|^2} (y' - r_1 x_1 - r_2 x_2 - r_3 x_3) \right) \quad \text{[Eqn. 9]}$$

$$x'_3 = \mathrm{slicer}\left( \frac{r_3^H}{\|r_3\|^2} (y' - r_1 x_1 - r_2 x_2 - r_4 x'_4) \right)$$

$$x'_2 = \mathrm{slicer}\left( \frac{r_2^H}{\|r_2\|^2} (y' - r_1 x_1 - r_3 x'_3 - r_4 x'_4) \right).$$

In Equation 9, y' denotes the vector acquired by multiplying the receive signal vector by the matrix Q acquired by QR-decomposing the channel matrix H, and $r_j$ denotes the j-th column of an upper triangle matrix acquired by QR-decomposing the channel matrix H.

Equation 9 can be normalized as Equation 10 below:

$$x'_j = \mathrm{slicer}\left( \frac{r_j^H}{\|r_j\|^2} \left( y' - \sum_{i=1, i \neq j}^{m} r_i x_i \right) \right). \quad \text{[Eqn. 10]}$$

In Equation 10, $x'_j$ denotes the replaced symbol of the j-th symbol, y' denotes the vector acquired by multiplying the receive signal vector by the matrix Q acquired by QR-decomposing the channel matrix H, m denotes the number of symbols, $r_i$ denotes the i-th column of an upper triangle matrix acquired by QR-decomposing the channel matrix H, $x_i$ denotes the i-th transmit symbol, and slicer (•) denotes the slicing operator.

In each phase, the receiver replaces the symbols other than the substituted symbol based on Equation 7. The order of the replacement affects the replacement of the symbols. According to one exemplary embodiment of the present invention, the order of the replacement firstly replaces the symbol corresponding to the column of the channel matrix having a large norm value using the channel ordering of the sub-optimum scheme. In doing so, as the sorting based on the magnitude of the norm value is first carried out in the signal detection, the receiver replaces the symbols in the pre-sorted order. The receiver needs to perform the replacement for as many times as the number of the symbols to be replaced for one transmit symbol vector. According to another exemplary embodiment of the present invention, the order of the replacement replaces the symbols in every possible order with respect to one transmit vector and selects one having the smallest square Euclidean distance after the replacement. In doing so, the receiver needs to conduct the replacement for as many times as the product of the factorial of the number of the symbols to be replaced for one transmit symbol vector and the number of the transmit symbols.

As described above, the estimated transmit signal vectors using the symbol replacement are far closer to the transmit signal vector. Accordingly, after replacing the symbols, the receiver selects some transmit signal vectors having the smallest square Euclidean distance as the candidate. Referring back to FIG. 1-A, after estimating 16 transmit signal vectors in the first phase, the receiver replaces $x_2$, $x_3$ and $x_4$ of the 16 transmit signal vectors respectively and then selects some transmit signal vector candidates having the smallest square Euclidean distance. In this embodiment of the present invention, only one transmit signal vector is selected as the candidate. In the second phase, the receiver substitutes every transmittable $x_2$ to $x_1$ of the single transmit signal vector selected as the candidate, and estimates 16 transmit signal vectors. Next, the receiver replaces $x_1$, $x_3$ and $x_4$ of the 16 transmit signal vectors and then selects only one transmit signal vector having the smallest square Euclidean distance as the candidate.

As described above, the substituted symbol limitation scheme of FIG. 9 and the symbol replacement scheme of Equation 7 or Equation 10 can be additionally applied to the MIMO signal detection of FIG. 1. It should be understood that the MIMO signal detection of the present invention is applicable to the case where both the substituted symbol limitation scheme and the symbol replacement scheme are adopted, the case where only the substituted symbol limitation scheme is adopted, and the case where only the symbol replacement scheme is adopted.

The structure and the operations of the receiver for calculating the LLR are explained now in detail by referring to the drawings.

Figure 2:
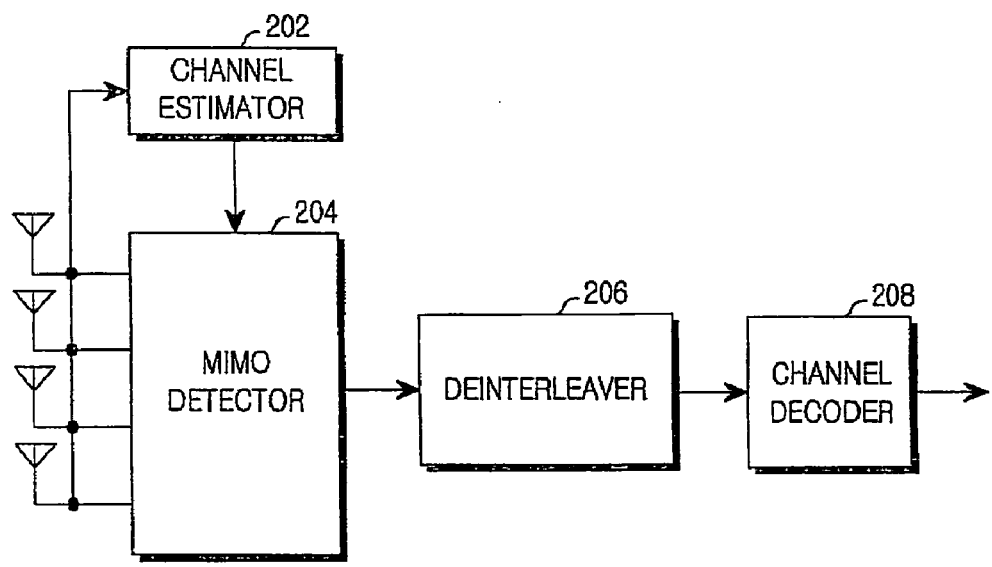
FIG. 2 illustrates a receiver in the MIMO wireless communication system according to an exemplary embodiment of the present invention.

FIG. 2 is a block diagram of the receiver in the MIMO wireless communication system according to an exemplary embodiment of the present invention.

The receiver of FIG. 2 includes a channel estimator 2 02, a MIMO detector 204, a deinterleaver 206, and a channel decoder 208.

The channel estimator 202 estimates a channel of the receive signal through the multiple receive antennas and provides the estimated channel to the MIMO detector 204. The MIMO detector 204 estimates the transmit signal vectors from the receive signal vectors and provides the LLRs of the receive bits to the deinterleaver 206. The structure and the operations of the MIMO detector 204 will be described in further detail.

The signals received on the receive antennas are Radio Frequency (RF) signals. Although it is not illustrated, the RF signals received on the receive antennas are converted to baseband sample data and then fed to the MIMO detector 204.

The deinterleaver 206 deinterleaves the LLRs output from the MIMO detector 204 according to a given rule. The channel decoder 208 restores information bit stream by soft-decision decoding the LLRs output from the deinterleaver 206.

Figure 3:
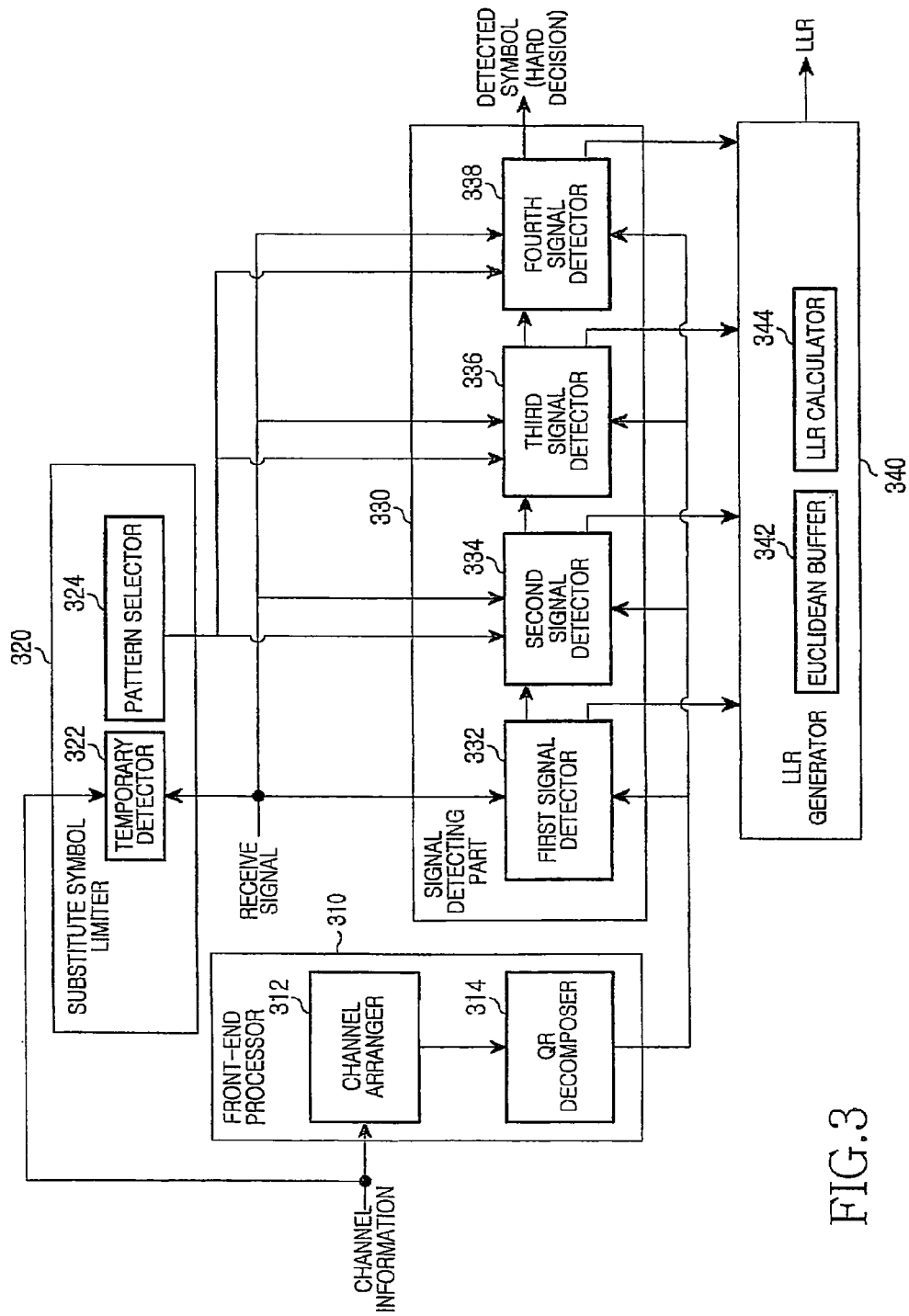
FIG. 3 illustrates a MIMO detector of FIG. 2.

FIG. 3 is a detailed block diagram of the MIMO detector 204 of FIG. 2.

The MIMO detector 204 of FIG. 3 includes a front-end processor 310, a substitute symbol limiter 320, a signal detecting part 330, and an LLR generator 340. The front-end processor 310 includes a channel arranger 312 and a QR decomposer 314. The substitute symbol limiter 320 includes a temporary detector 322 and a pattern selector 324. The signal detecting part 330 includes a plurality of signal detectors 332 through 338. The LLR generator 340 includes a Euclidean buffer 342 and an LLR calculator 344.

The input to the MIMO detector 204 is the channel matrix, the estimated noise variance, and the receive signal vector. The output from the MIMO detector 204 is the detected transmit signal vector in the hard decision system and the LLRs of the receive bits in the soft decision system.

The channel arranger 312 arranges the columns of the channel matrix based on the SNR per antenna. For example, the channel arranger 312 computes the norm values of the columns of the channel matrix and arranges the columns in order of the norm value. In other words, the channel arranger 312 arranges the columns of the channel matrix so as to detect first the signal of the transmit antenna having the best channel condition (i.e., having the greatest magnitude of channel coefficient value).

The QR decomposer 314 QR-decomposes the channel matrix output from the channel arranger 312. The QR decomposition indicates the decomposition of the channel matrix as expressed in Equation 5.

The substitute symbol limiter 320 limits the transmittable symbols, corresponding to the receive antennas, to be substituted in each phase. In more detail, the substitute symbol limiter 320 receives the receive signal and the channel information, temporarily estimates the transmit signal vector using the ZF scheme or the MMSE scheme, and limits the symbols to be substituted in each phase according to the soft value of the temporarily estimated transmit signal vector. For instance, using 64-QAM, the substitute symbol limiter 320 limits the transmittable symbols to be substituted in each phase in the pattern of FIGS. 9A to 9P. In doing so, schemes other than the ZF scheme and the MMSE scheme can be employed. The limited substitute symbol information is provided to the corresponding signal detector.

The first signal detector 332 estimates the transmit signal vectors with respect to all the transmittable symbols of the first symbol $x_1$ using the QRD-OSIC scheme, determines a preset number of candidate groups in order of the smallest square Euclidean distance value, and provides the determined candidate groups to the second signal detector 334. For example, using 64-QAM, the first signal detector 332 calculates 64 transmit signal vectors, determines the candidate groups, and provides the candidate groups to the second signal detector 334. The first signal detector 332 provides the square Euclidean distances of the estimated 64 transmit signal vectors to the LLR generator 340. The structure of the first signal detector 332 will be illustrated by referring to FIG. 4.

The second signal detector 334 estimates the transmit signal vectors using the QRD-OSIC scheme by substituting the substitute symbols limited by the substitute symbol limiter 320 into the second symbol $x_2$ in the $x_1$ candidate groups output from the first signal detector 332, replaces the symbols excluding the second symbol $x_2$ in the transmit signal vectors with symbols closer to the actual transmit signal, determines a preset number of $x_1$ and $x_2$ candidate groups in order of the smallest square Euclidean distance value, and provides the candidate groups to the third signal detector 336. For example, when the transmit signal is modulated using 64-QAM, 25 transmittable symbols are limited, and the candidate group includes 3 transmit signal vectors. The second signal detector 334 calculates 75 (=3×25) transmit signal vectors, determines candidate groups, and provides the candidate groups to the third signal detector 336. The second signal detector 334 also provides the square Euclidean distances of the estimated transmit signal vectors to the LLR generator 340. The structure of the second signal detector 334 will be explained in more detail by referring to FIG. 5.

The third signal detector 336 and the fourth signal detector 338 perform the similar functions to the second signal detector 334, i.e., they receive the candidate groups from the previous signal detector and determine new candidate groups. Note that the fourth signal detector 338 does not constitute a candidate group. The structures of the third signal detector 336 and the fourth signal detector 338 will be explained by referring to FIGS. 6 and 7.

The Euclidean buffer 342 stores the square Euclidean distances provided from the signal detectors 332 through 338, and provides the stored square Euclidean distance values to the LLR calculator 344 for LLR calculation. The LLR calculator 344 calculates the LLRs of the receive bits using the square Euclidean distance values output from one of the signal detectors 332 through 338 and the square Euclidean distance values stored to the Euclidean buffer 342 based on Equation 11:

$$LLR(b_{ti}) = \min_{x \in S_{t,i,0}} \|y - Hx\|^2 - \min_{x \in S_{t,i,1}} \|y - Hx\|^2 \quad [\text{Eqn. 11}]$$

$$i = 1, 2, \ldots, m$$

$$S_{t,i,0} = \{x \mid b_{ti} = 0\}, \quad S_{t,i,1} = \{x \mid b_{ti} = 1\}.$$

In Equation 11, $LLR(b_{ti})$ denotes the LLR of the i-th bit of the t-th symbol, x denotes the transmit signal vector, y denotes the receive signal vector, H denotes the channel matrix, m denotes the number of the transmit antennas, $S_{t,i,0}$ denotes the transmit signal vector set where the i-th bit of the t-th symbol is 0, and $S_{t,i,1}$ denotes the transmit signal vector set where the i-th bit of the t-th symbol is 1.

Using the square Euclidean distance values provided from the first signal detector 332, the LLR calculator 344 calculates the LLRs of the bits of the first symbol. For example, to calculate LLR($b_{11}$), the LLR calculator 344 classifies the square Euclidean distance values provided from the first signal detector 332 to a category having $b_{11}$ of 0 and a category having $b_{11}$ of 1, calculates the difference between the minimum values of the classified values, and thus acquires LLR ($b_{11}$). The LLR calculator 344 updates the LLRs of the bits of the first symbol using the square Euclidean distance values provided from the second signal detector 334 and the square Euclidean distance values of the first signal detector 332 stored to the Euclidean buffer 342, and calculates the per bit LLR of the second symbol. The LLR calculator 344 updates the per bit LLRs of the first symbol and the second symbol using the square Euclidean distance values provided from the third signal detector 336 and the square Euclidean distance values of the first signal detector 332 and the second signal detector 334 stored to the Euclidean buffer 342, and calculates the per bit LLR of the third symbol. The LLR calculator 344 updates the per bit LLRs of the first symbol, the second symbol, and the third symbol using the square Euclidean distance values provided from the fourth signal detector 338 and the square Euclidean distance values of the first signal detector 332, the second signal detector 334, and the third signal detector 336 stored to the Euclidean buffer 342, and calculates the per bit LLR of the fourth symbol. The acquired LLRs are fed to the channel decoder 208 via the deinterleaver 206 and used for the soft decision decoding of the channel decoder 208.

Figure 4:
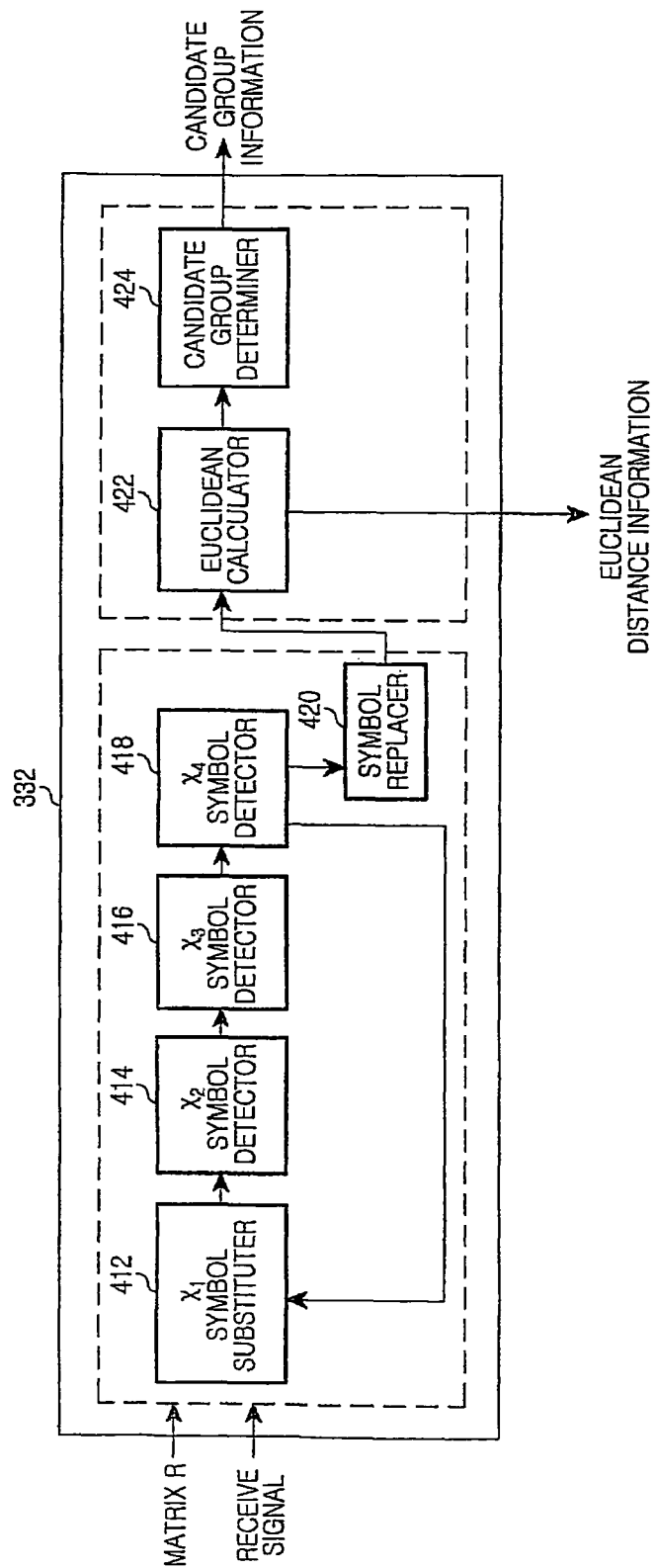
FIG. 4 illustrates a first signal detector of FIG. 3.

FIG. 4 is a detailed block diagram of the first signal detector 332 of FIG. 3.

The first signal detector 332 of FIG. 4 includes a $x_1$ symbol substituter 412, a $x_2$ symbol detector 414, a $x_3$ symbol detector 416, a $x_4$ symbol detector 418, a symbol replacer 420, a Euclidean calculator 422, and a candidate group determiner 424.

The $x_1$ symbol substituter 412 selects and outputs all the symbols transmittable as the first symbol $x_1$ one by one in sequence. The $x_2$ symbol detector 414, the $x_3$ symbol detector 416, and the $x_4$ symbol detector 418 sequentially detect $x_2$, $x_3$ and $x_4$ using the characteristics of the matrix R. Based on Equation 6, the $x_2$ symbol detector 414 detects the second symbol $x_2$ by subtracting the product of $x_1$ and $r_{3,4}$ from $y'_2$, dividing the result by $r_{3,3}$, and slicing the result. Likewise, the $x_3$ symbol detector 416 and the $x_4$ symbol detector 418 detect $x_3$ and $x_4$. The computations of the $x_2$ symbol detector 414, the $x_3$ symbol detector 416, and the $x_4$ symbol detector 418 are expressed as Equation 12:

$$x_2 = \text{slicer}\left(\frac{y'_2 - r_{3,4}x_1}{r_{3,3}}\right)$$ [Eqn. 12]

$$x_3 = \text{slicer}\left(\frac{y'_3 - r_{2,3}x_2 - r_{2,4}x_1}{r_{2,2}}\right)$$

$$x_4 = \text{slicer}\left(\frac{y'_4 - r_{1,2}x_3 - r_{1,3}x_2 - r_{1,4}x_1}{r_{1,1}}\right).$$

In Equation 12, $x_t$ denotes the t-th transmit symbol, slicer (.) denotes the slicing operator, $y'_t$ denotes the t-th receive signal of the receive signal vector multiplied by the matrix QQ, and $r_{i,j}$ denotes the element in the i-th row and the j-th column of the matrix R.

Namely, the estimated transmit signal vectors are generated in the same number as the size of the constellation of $x_1$ by detecting the signal at the $x_2$ symbol detector 414, the $x_3$ symbol detector 416, and the $x_4$ symbol detector 418 using the QRD-OSIC scheme based on the $x_1$ symbol output from the $x_1$ symbol substituter 412.

The symbol replacer 420 replaces $x_2$, $x_3$ and $x_4$ detected by the $x_2$ symbol detector 414, the $x_3$ symbol detector 416, and the $x_4$ symbol detector 418 respectively. In more detail, the symbol replacer 420 removes the component of the symbols excluding the target symbol to be replaced from the receive signal vector. Next, the symbol replacer 420 replaces the target symbol with another transmittable symbol to minimize the norm value of the subtraction of the component of the receive signal vector from which the component of the other symbols are removed and the component of the target symbol. For example, the symbol replacer 420 replaces $x_4$, $x_3$ and $x_2$ based on Equation 7 or Equation 10.

The Euclidean calculator 422 calculates the square Euclidean distances between the receive signal vector and the estimated transmit signal vectors. The candidate group determiner 424 selects a preset number of the transmit signal vectors in order of the smallest distance values output from the Euclidean calculator 422, drops $x_2$, $x_3$ and $x_4$ for the selected transmit signal vectors, and provides the $x_1$ candidate group to the second signal detector 334. At this time, the number of the $x_1$ candidates included in the $x_1$ candidate group varies according to various embodiments. The Euclidean calculator 422 provides the acquired square Euclidean distance values to the LLR generator 340.

Figure 5:
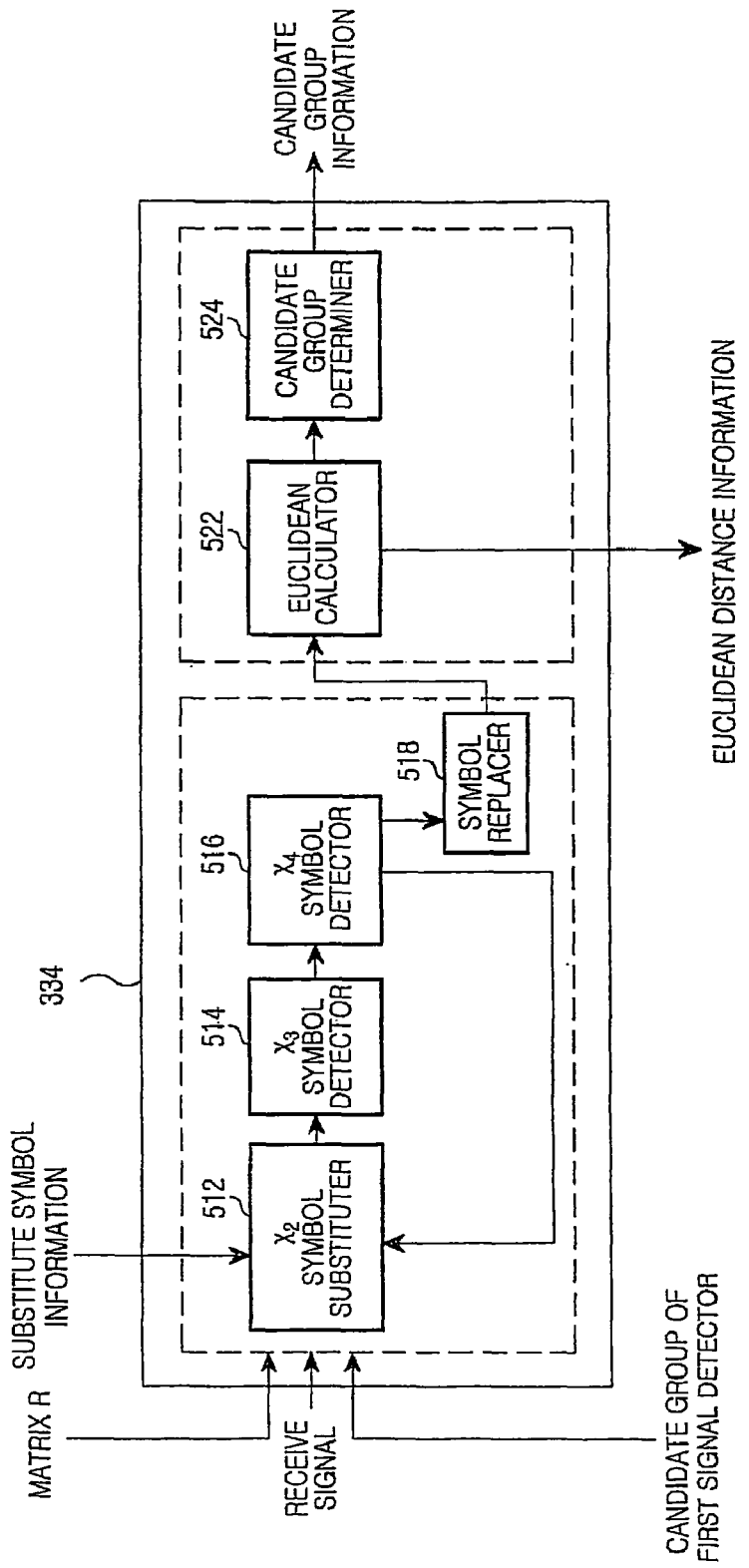
FIG. 5 illustrates a second signal detector of FIG. 3.

FIG. 5 is a detailed block diagram of the second signal detector 334 of FIG. 3.

The second signal detector 334 of FIG. 5 includes a $x_2$ symbol substituter 512, a $x_3$ symbol detector 514, a $x_4$ symbol detector 516, a symbol replacer 518, a Euclidean calculator 522, and a candidate group determiner 524.

The $x_2$ symbol substituter 512 substitutes the substitute symbols limited by the substitute symbol limiter 320 into the fed $x_1$ candidate group as $x_2$. The $x_3$ symbol detector 514 and the $x_4$ symbol detector 516 detect $x_3$ and $x_4$ in sequence using the characteristics of the matrix R. Based on Equation 6, the $x_3$ symbol detector 514 detects the third symbol $x_3$ by subtracting the products of $x_1$ and $x_2$ combination and $r_{2,4}$ and $r_{2,3}$ from $y'_3$, dividing the result by $r_{2,2}$, and slicing the result. Likewise, the $x_4$ symbol detector 516 detects $x_4$. The computations of the $x_3$ symbol detector 514 and the $x_4$ symbol detector 516 are expressed as Equation 13:

$$x_3 = \text{slicer}\left(\frac{y'_3 - r_{2,3}x_2 - r_{2,4}x_1}{r_{2,2}}\right)$$ [Eqn. 13]

$$x_4 = \text{slicer}\left(\frac{y'_4 - r_{1,2}x_3 - r_{1,3}x_2 - r_{1,4}x_1}{r_{1,1}}\right).$$

In Equation 13, $x_t$ denotes the t-th transmit symbol, slicer (.) denotes the slicing operator, $y'_t$ denotes the t-th receive signal of the receive signal vector multiplied by the matrix Q, and $r_{i,j}$ denotes the element in the i-th row and the j-th column of the matrix R.

Namely, the estimated transmit signal vectors are generated in the same number as the number of the outputs of the $x_2$ symbol substituter 512 by detecting the signal at the $x_3$ symbol detector 514 and the $x_4$ symbol detector 516 using the QRD-OSIC scheme based on the $x_1$ and $x_2$ combination output from the $x_2$ symbol substituter 512.

The symbol replacer 518 replaces $x_1$ output from the first signal detector 332, and $x_3$ and $x_4$ detected by the $x_3$ symbol detector 514 and the $x_4$ symbol detector 516, respectively. More specifically, the symbol replacer 518 removes the component of the symbols excluding the target symbol to be replaced from the receive signal vector. Next, the symbol replacer 518 replaces the target symbol with another transmittable symbol to minimize the norm value of the subtraction of the component of the receive signal vector from which the component of the other symbols are removed and the component of the target symbol. For example, the symbol replacer 518 replaces $x_4$, $x_3$ and $x_1$ based on Equation 7 or Equation 10.

The Euclidean calculator 522 calculates the square Euclidean distances between the receive signal vector and the estimated transmit signal vectors. The candidate group determiner 524 selects a preset number of the transmit signal vectors in order of the smallest distance values output from the Euclidean calculator 522, drops $x_3$ and $x_4$ for the selected transmit signal vectors, and provides the $x_1$-$x_2$ candidate groups to the third signal detector 336. The number of the $x_1$-$x_2$ candidates included in the $x_1$-$x_2$ candidate group varies according to various embodiments. The Euclidean calculator 522 provides the acquired square Euclidean distance values to the LLR generator 340.

Figure 6:
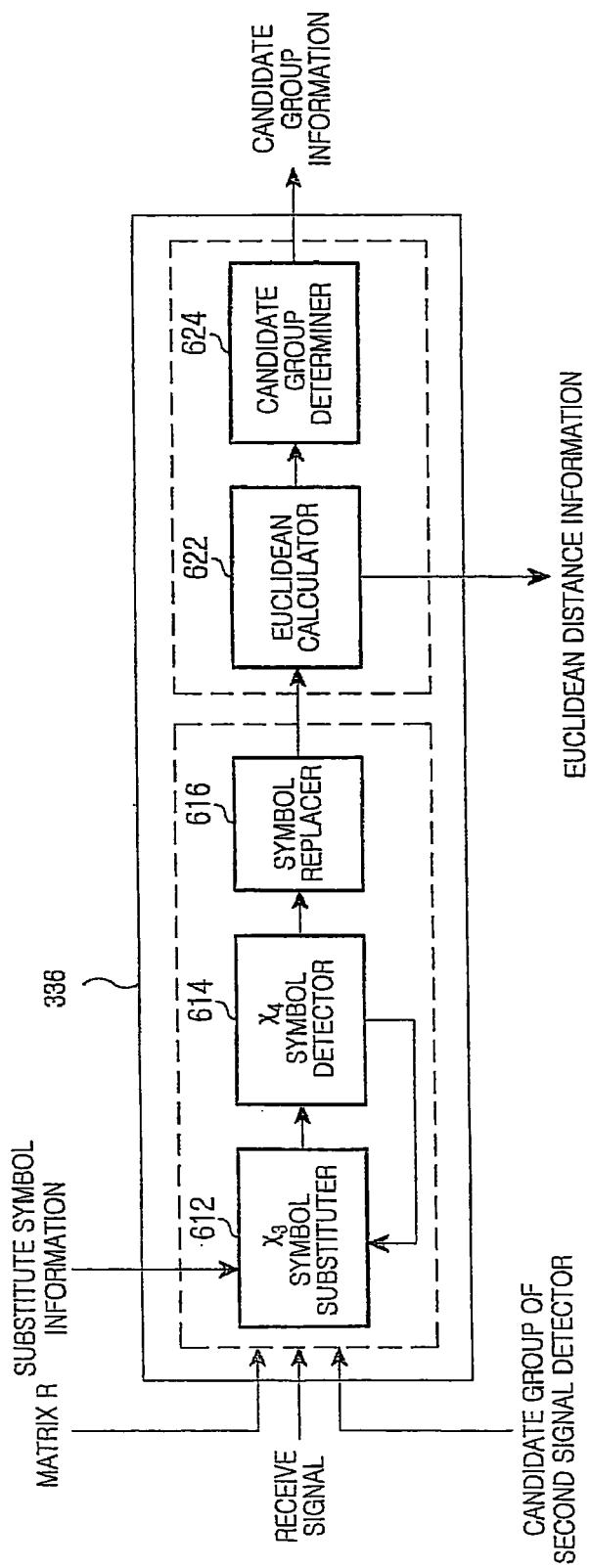
FIG. 6 illustrates a third signal detector of FIG. 3.

FIG. 6 is a detailed block diagram of the third signal detector 336 of FIG. 3.

The third signal detector 336 of FIG. 6 includes a $x_3$ symbol substituter 612, a $x_4$ symbol detector 614, a symbol replacer 616, a Euclidean calculator 622, and a candidate group determiner 624.

The $x_3$ symbol substituter 612 substitutes the substitute symbols limited by the substitute symbol limiter 320 into the fed $x_1$ and $x_2$ candidate groups as $x_3$. The $x_4$ symbol detector 614 detects $x_4$ using the characteristics of the matrix R. Based on Equation 6, the $x_4$ symbol detector 614 detects the fourth symbol $x_4$ by subtracting the products of $x_{1,2}$ and $x_3$ combination and $r_{1,4}$, $r_{1,3}$ and $r_{1,2}$ from $y'_4$, dividing the result by $r_{1,1}$, and slicing the result. The computation of the $x_4$ symbol detector 614 is expressed as Equation 14:

$$x_4 = \text{slicer}\left(\frac{y'_4 - r_{1,2}x_3 - r_{1,3}x_2 - r_{1,4}x_1}{r_{1,1}}\right). \quad [\text{Eqn. 14}]$$

In Equation 14, $x_t$ denotes the t-th transmit symbol, slicer (.) denotes the slicing operator, $y'_t$ denotes the t-th receive signal of the receive signal vector multiplied by the matrix Q, and $r_{i,j}$ denotes the element in the i-th row and the j-th column of the matrix R.

Namely, the estimated transmit signal vectors are generated in the same number as the number of the outputs of the $x_3$ symbol substituter 612 by detecting the signal at the $x_4$ symbol detector 614 using the QRD-OSIC scheme based on the $x_3$ symbols output from the $x_3$ symbol substituter 612.

The symbol replacer 616 replaces $x_1$ output from the second signal detector 334, $x_2$, and $x_4$ detected by the $x_4$ symbol detector 614. More specifically, the symbol replacer 616 removes the component of the symbols excluding the target symbol to be replaced from the receive signal vector. Next, the symbol replacer 616 replaces the target symbol with another transmittable symbol to minimize the norm value of the subtraction of the component of the receive signal vector from which the component of the other symbols are removed and the component of the target symbol. For example, the symbol replacer 616 replaces $x_4$, $x_2$ and $x_1$ based on Equation 7 or Equation 10.

The Euclidean calculator 622 calculates the square Euclidean distances between the receive signal vector and the estimated transmit signal vectors. The candidate group determiner 624 selects a preset number of the transmit signal vectors in order of the smallest distance values output from the Euclidean calculator 622, drops $x_4$ for the selected transmit signal vectors, and provides the $x_1$-$x_2$-$x_3$ candidate groups to the fourth signal detector 338. The number of the $x_1$-$x_2$-$x_3$ candidates included in the $x_1$-$x_2$-$x_3$ candidate group varies according to various embodiments. The Euclidean calculator 622 provides the acquired square Euclidean distance values to the LLR generator 340.

Figure 7:
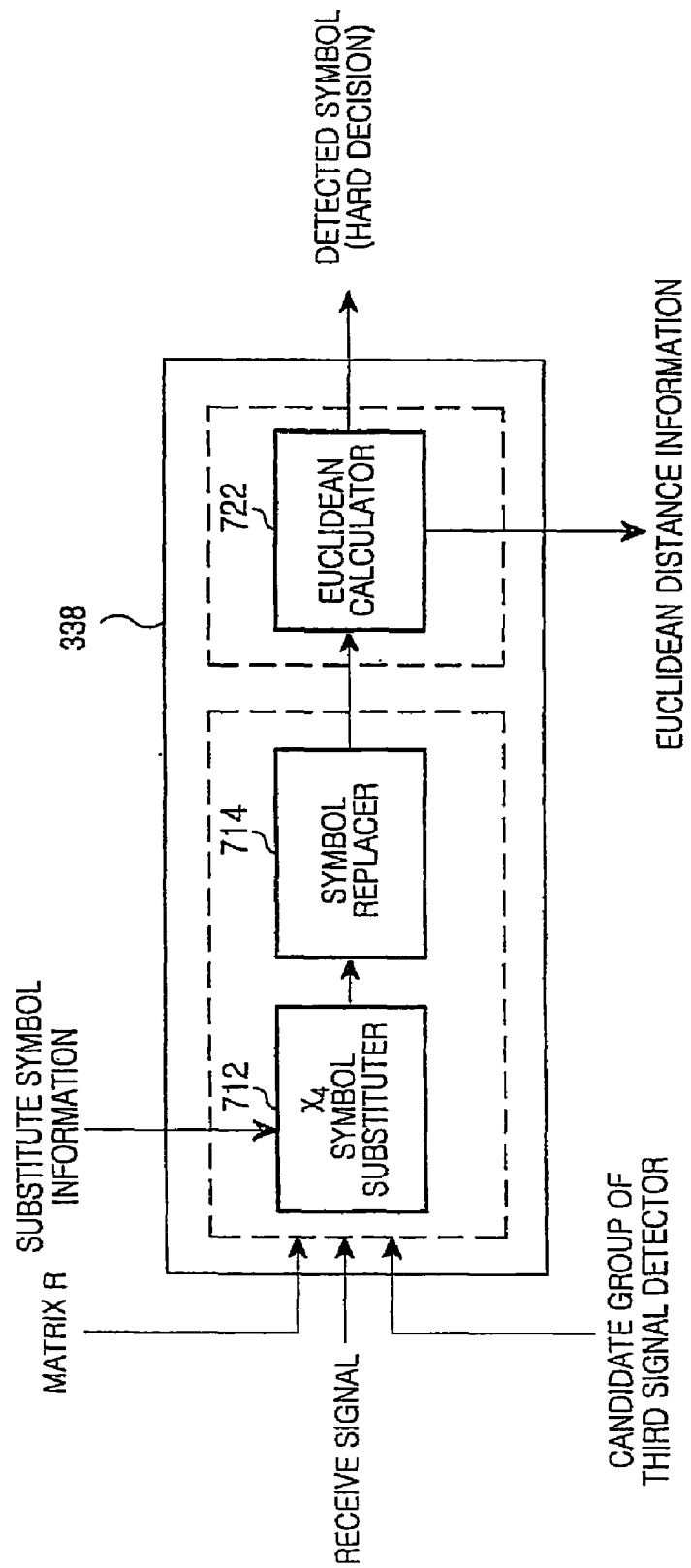
FIG. 7 illustrates a fourth signal detector of FIG. 3.

FIG. 7 is a detailed block diagram of the fourth signal detector 338 of FIG. 3.

The fourth signal detector 338 include a $x_4$ symbol substituter 712, a symbol replacer 714 and a Euclidean calculator 722.

The $x_4$ symbol substituter 712 constitutes the transmit signal vectors by substituting the substitute symbols limited by the substitute symbol limiter 320 into the $x_1$, $x_2$ and $x_3$ candidate groups output from the third signal detector 336 as $x_4$.

The symbol replacer 714 replaces $x_1$, $x_2$ and $x_3$ output from the third signal detector 336. More specifically, the symbol replacer 616 removes the component of the symbols excluding the target symbol to be replaced from the receive signal vector. Next, the symbol replacer 714 replaces the target symbol with another transmittable symbol to minimize the norm value of the subtraction of the component of the receive signal vector from which the component of the other symbols are removed and the component of the target symbol. For example, the symbol replacer 714 replaces $x_3$, $x_2$ and $x_1$ based on Equation 7 or Equation 10.

The Euclidean calculator 722 calculates the square Euclidean distances between the receive signal and the estimated transmit signal vectors. When performing the hard decision, the receiver outputs the transmit signal vector of the smallest square Euclidean distance value. When performing the soft decision, the Euclidean calculator 722 provides the calculated square Euclidean distance values to the LLR generator 340.

In the receiver of FIGS. 2 through 7, the substitute symbol limiter 320 limits the substituted symbol and the symbol replacers 420, 518, 616 and 714 replace the symbols. Alternatively, one of the substituted symbol limitation and the symbol replacement can be omitted. In such embodiments, the substitute symbol limiter 320 may not be provided, or the symbol replacers 420, 518, 616 and 714 may not be provided. Without the substitute symbol limiter 320, the symbol substituters 412, 512, 612 and 712 substitute all the transmittable symbols.

Figure 8A:
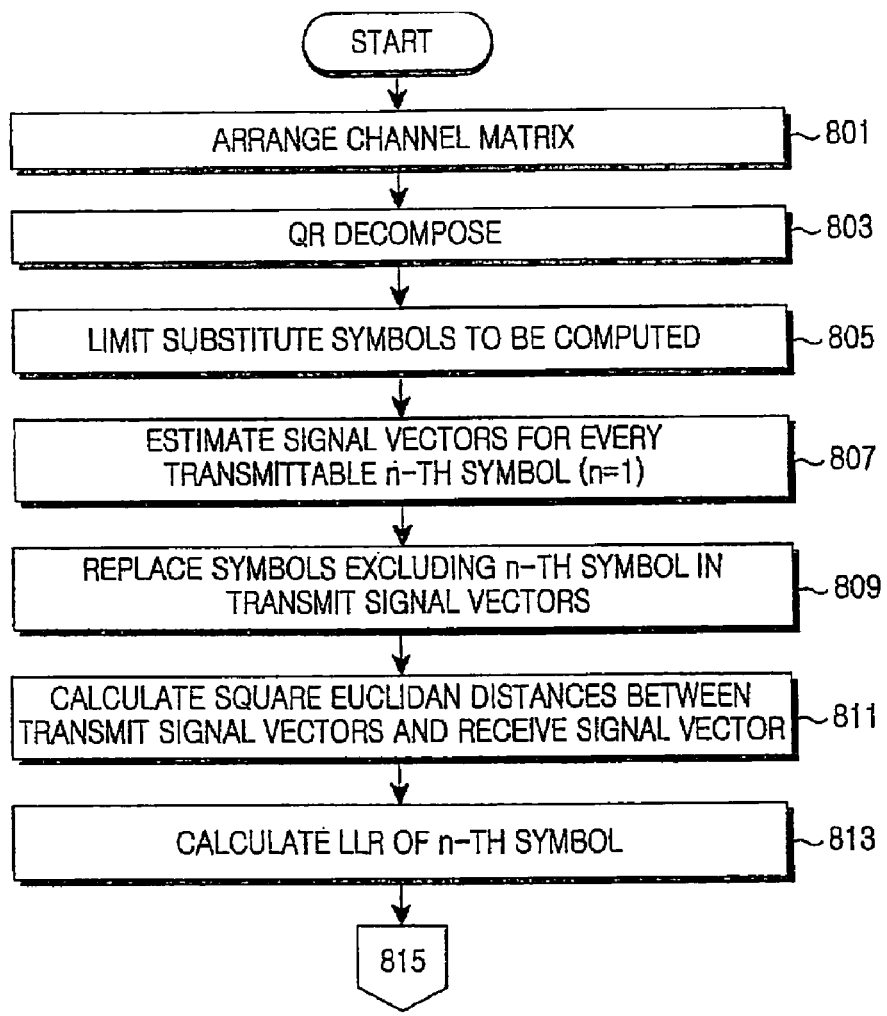
FIGS. 8A and 8B illustrate a signal detecting method of the receiver in the MIMO wireless communication system according to an exemplary embodiment of the present invention.
Figure 8B:
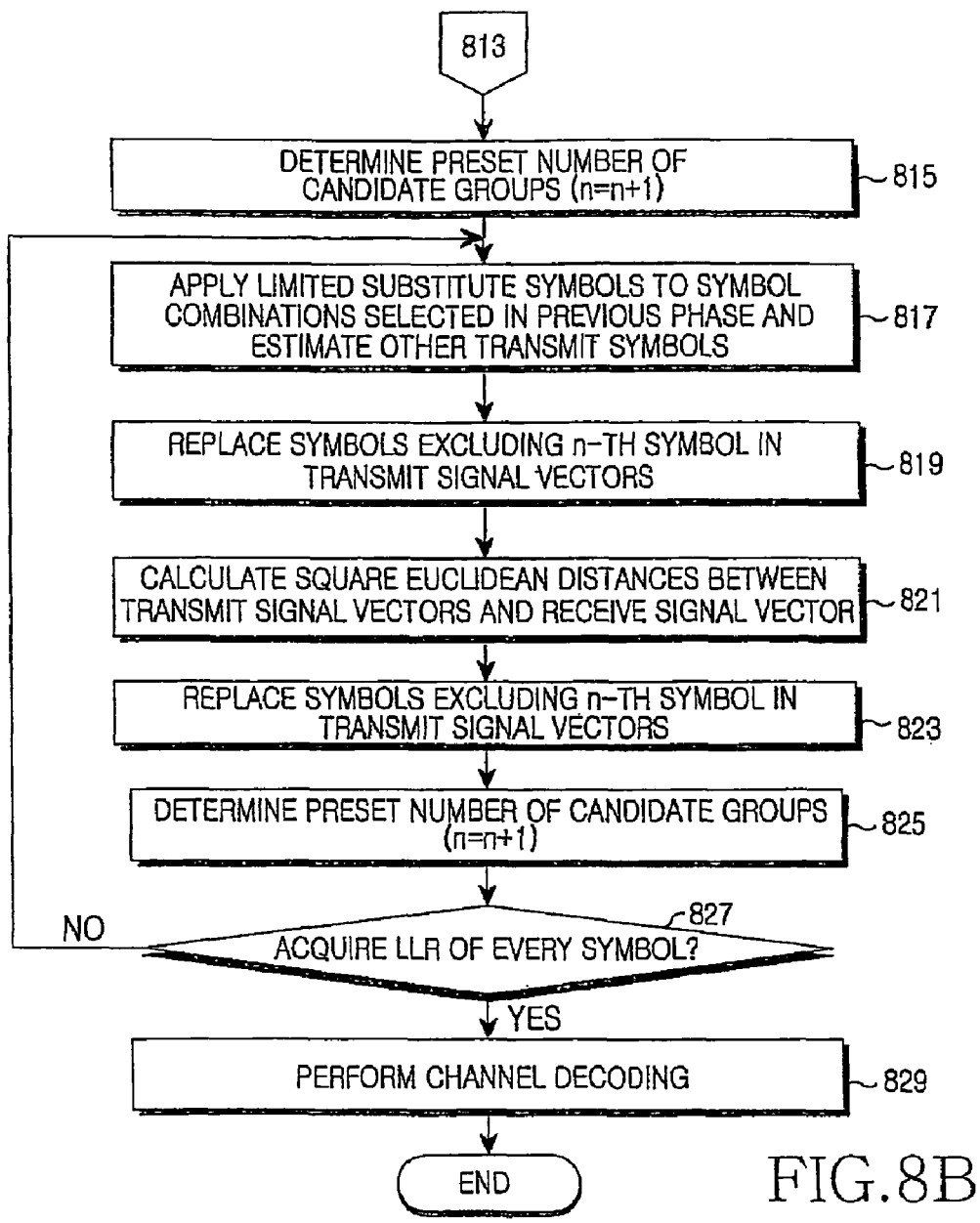

FIGS. 8A and 8B illustrate a signal detecting method of the receiver in the MIMO wireless communication system according to an exemplary embodiment of the present invention.

In step 801, the receiver arranges the columns of the channel matrix according to the SNR per antenna. For example, the receiver calculates the norm values of the columns of the channel matrix and arranges the columns in order of the size of the norm value.

In step 803, the receiver QR-decomposes the channel matrix. The QR decomposition decomposes the channel matrix as expressed in Equation 5.

In step 805, the receiver limits the transmittable symbols to be substituted in the phases when selecting the candidate groups in the subsequent phases. More specifically, the receiver temporarily estimates the transmit signal vector using the ZF scheme or the MMSE scheme and limits the transmittable symbols to be substituted in the phases based on the soft value of the temporarily estimated transmit signal vector. For example, using 64-QAM, the substitute symbols are limited in the pattern of FIGS. 9A to 9P. In doing so, schemes other than the ZF scheme and the MMSE scheme can be employed.

In step 807, the receiver detects the transmit signal vector based on every n-th transmittable symbol using the QRD-OSIC scheme. Herein, n is initialized to 1. When n is 1, the receiver estimates the transmit signal vectors by the modulation order of the first symbol $x_1$.

In step 809, the receiver replaces the symbols excluding the n-th symbol of the transmit signal vectors with symbols closer to the actual transmit signal. More specifically, the receiver removes the component of the symbols excluding the target symbol to be replaced from the receive signal vector. Next, the receiver replaces the target symbol with another transmittable symbol so as to minimize the norm value of the subtraction of the component of the receive signal vector from which the component of the other symbols are removed and the component of the target symbol. For example, the receiver replaces the symbols based on Equation 7 or Equation 10.

In step 811, the receiver calculates the square Euclidean distance values between the transmit signal vectors and the receive signal vector.

In step 813, the receiver calculates the per bit LLR of the n-th symbol. For example, the LLR is acquired based on Equation 11.

In step 815, the receiver determines the $x_1$ candidate group by selecting the preset number of the transmit signal vectors. The receiver selects the transmit signal vectors in order of the smallest square Euclidean distance value from the receive signal vector. n is increased by 1.

In step 817, the receiver substitutes the substitute symbol limited in step 805 into the symbol combinations of the candidate group determined in the previous phase as n-th symbol, and detects the other transmit symbols using the characteristics of the matrix R. The number of the estimated transmit signal vectors is {the number of the transmit signal vectors selected in the (n−1)-th phase}×{the number of the limited substitute symbols}.

In step 819, the receiver replaces the symbols excluding the n-th symbol of the transmit signal vectors with symbols closer to the actual transmit signal. More specifically, the receiver removes the component of the symbols excluding the target symbol to be replaced from the receive signal vector. Next, the receiver replaces the target symbol with another transmittable symbol to minimize the norm value of the subtraction of the component of the receive signal vector from which the component of the other symbols are removed and the component of the target symbol. For example, the receiver replaces the symbols based on Equation 7 or Equation 10.

In step 821, the receiver calculates the square Euclidean distance values between the transmit signal vectors and the receive signal vector.

In step 823, the receiver calculates and updates the per bit LLRs of the first through n-th symbols using the square Euclidean distance values of the transmit symbol vectors estimated in the previous phases and the square Euclidean distance values of the transmit signal vectors estimated in the current phase. For example, the LLRs are calculated and updated based on Equation 11.

In step 825, the receiver determines $x_1, \ldots, x_n$ candidate groups by selecting a preset number of the transmit signal vectors. The transmit signal vectors are selected in order of the small square Euclidean distance value from the receive signal vector. n is increased by 1.

In step 827, the receiver checks whether the LLR of every symbol is acquired, i.e., the receiver checks whether n is greater than the number of the transmit symbols.

When acquiring the LLR of every symbol, the receiver performs the soft decision decoding using the LLRs in step 829. By contrast, when not acquiring the LLR of every symbol, the receiver repeats steps 817 through 827.

The method of FIGS. 8A and 8B are conducted when the receiver performs the soft decision. When performing the hard decision, the receiver substitutes the transmittable symbols for the N-th symbol into the candidate group including (N−1)-ary symbols of the N-ary symbols, and then executes the hard decision using the transmit symbol vector having the smallest square Euclidean distance value from the receive signal vector. In doing so, the LLR calculation in FIGS. 8A and 8B can be omitted.

In the method of FIGS. 8A and 8B, the step 805 limits the substituted symbol in each phase, and the steps 809 and 819 replace the symbols in each phase. Alternatively, one of the substitute symbol limitation and the symbol replacement may be omitted. Without the substitute symbol limitation, the receiver adds all the transmittable symbols in step 817.

Figure 10A:
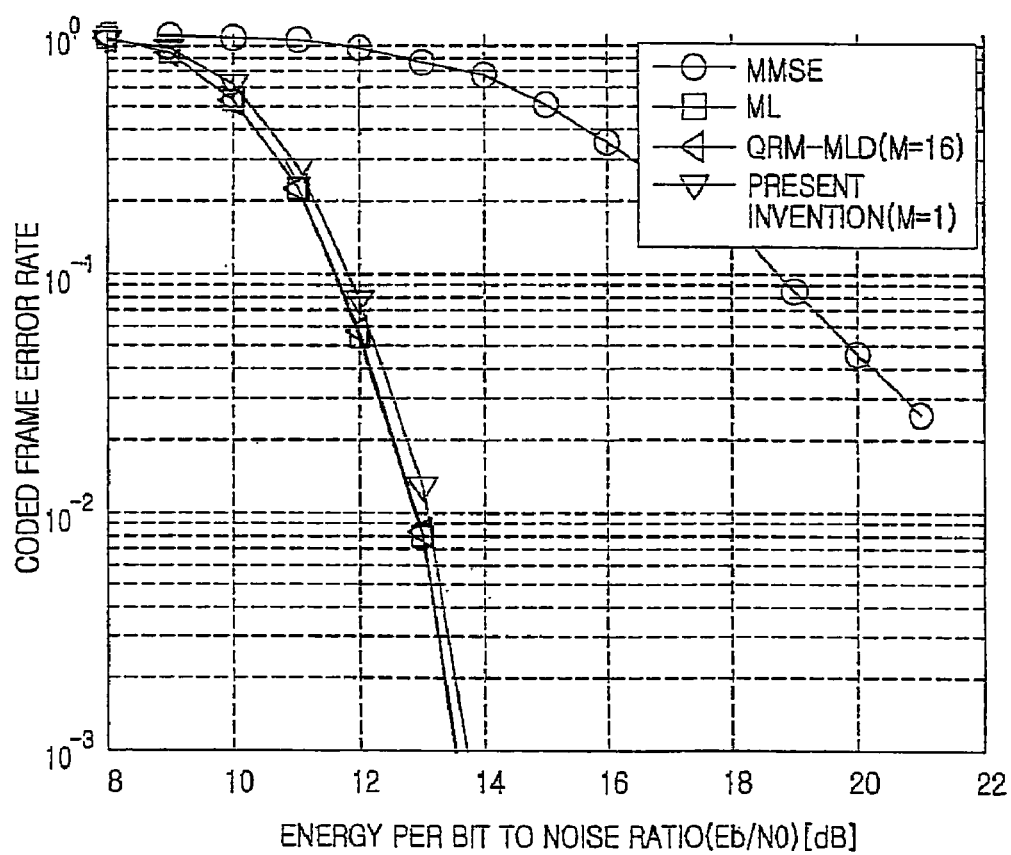
FIGS. 10A and 10B illustrate a performance of the signal detecting method according to an exemplary embodiment of the present invention.
Figure 10B:
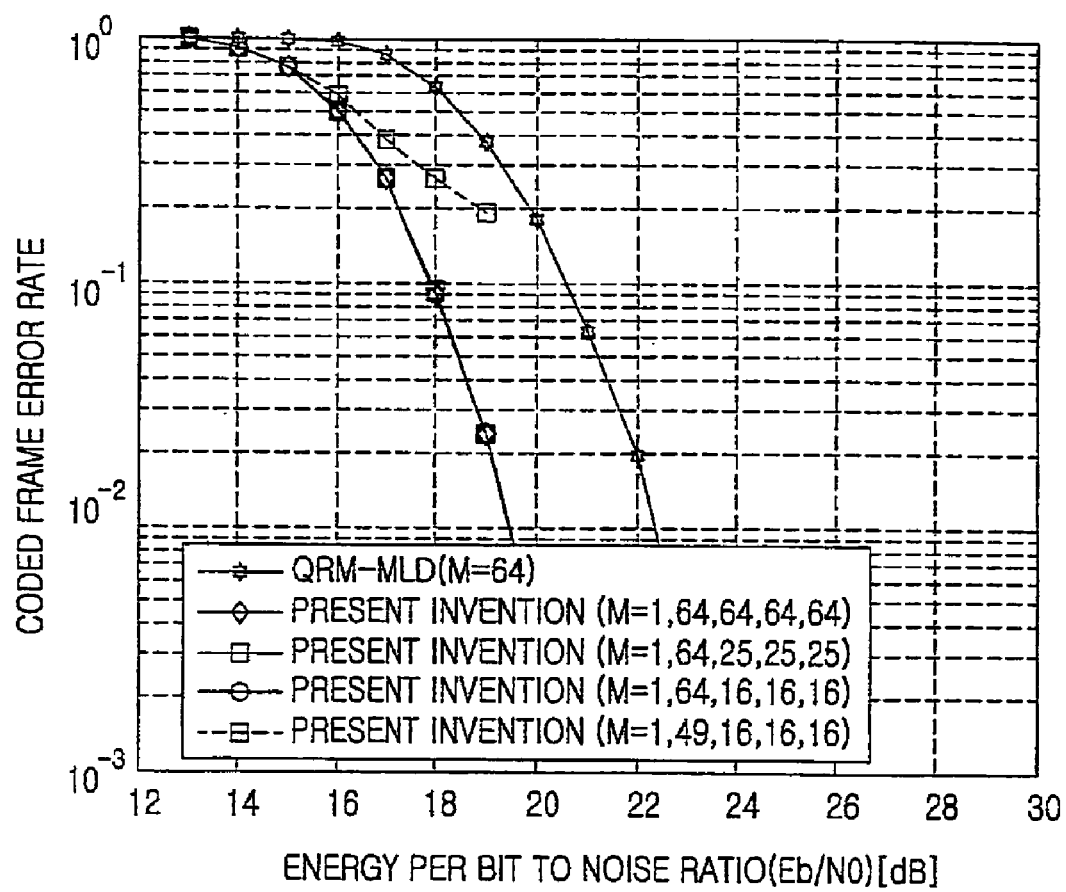

FIGS. 10A and 10B illustrate a performance of the signal detecting method according to an exemplary embodiment of the present invention. Particularly, FIGS. 10A and 10B are graphs illustrating simulation results of the system adopting the signal detecting method of the present invention. The simulation environment includes four transmit antennas, four receive antennas, the modulation scheme of 16-QAM or 64-QAM, the channel of independent and identically distributed (i.i.d) Rayleigh fading channel, and the channel coding of the convolutional coding at ½ code rate.

The graph of FIG. 10A compares the performance when the conventional signal detecting methods and the present signal detecting method are applied to the 16-QAM hard decision system. The horizontal axis indicates an energy per bit to noise ratio (Eb/N0), and the vertical axis indicates the coded frame error rate. M=k implies that the number of the symbol combinations in the candidate group determined in each phase is k. As shown in FIG. 10A, the present method exhibits the performance substantially similar to the ML scheme of optimum performance.

The graph of FIG. 10B compares the performance based on the number of the transmit signal vectors of the candidate group when the present signal detecting method is applied to the 64-QAM hard decision system. The horizontal axis indicates an energy per bit to noise ratio (Eb/N0), and the vertical axis indicates the coded frame error rate. M=k-$m_1$, $m_2$, $m_3$, $m_4$ implies that the number of the symbol combinations in the candidate group determined in each phase is k, and the number of the substitute symbols substituted in each phase is $m_1$, $m_2$, $m_3$, $m_4$. As shown in FIG. 10B, even when the number of the symbol combinations in the candidate group is minimum 1 and the number of the substitute symbols in the phases is set to 64, 16, 16, and 16, the present method enhances the performance by about 2.8 dB compared to QR decomposition and the M-algorithm-Maximum Likelihood Detection (QRM-MLD) scheme at the frame error rate $10^{-2}$. Consequently, it is clear that the present method achieves performance similar to optimum performance and low computational complexity in 64-QAM.

Table 1 shows the number of the multiplications and the number of the divisions in the conventional methods and the present method.

TABLE 1

|  | Multiplications | Divisions |
| --- | --- | --- |
| MMSE (16-QAM) | 496 | 8 |
| QRM-MLD (16-QAM) | 2560 | 4 |
| SMML (16-QAM) | 1768 | 16 |

TABLE 1-continued

|  | Multiplications | Divisions |
|---|---|---|
| ML (16-QAM) | 524288 | 0 |
| QRM-MLD (64-QAM/M = 64) | 24992 | 4 |
| present invention (16-QAM/M = 1) | 596 | 4 |
| present invention (16-QAM/M = 2) | 776 | 4 |
| present invention (16-QAM/M = 3) | 956 | 4 |
| present invention (16-QAM/M = 4) | 1136 | 4 |
| present invention (64-QAM/ M = 1, 64-64-64-64) | 1553 | 4 |
| present invention (64-QAM/ M = 1, 64-25-25-25) | 1088 | 4 |
| present invention (64-QAM/ M = 1, 64-16-16-16) | 992 | 4 |

Compared to the QRM-MLD (M=16) of substantially the same performance as the present method, the present method exhibits computational complexity of about ¼ with the minimum candidate group. By changing the number of the symbol combinations included in the candidate group, the computational complexity and the performance are properly regulated. In the present invention using the minimum symbol combination as the candidate group, the computational complexity is similar to the MMSE scheme of 16-QAM.

As set forth above, in the MIMO wireless communication system using the SM scheme, the candidate group is generated using the non-ML signal detection scheme, and the LLRs are generated and updated. Therefore, the receiver can accomplish performance similar to the ML scheme with low complexity.

Figure 11:
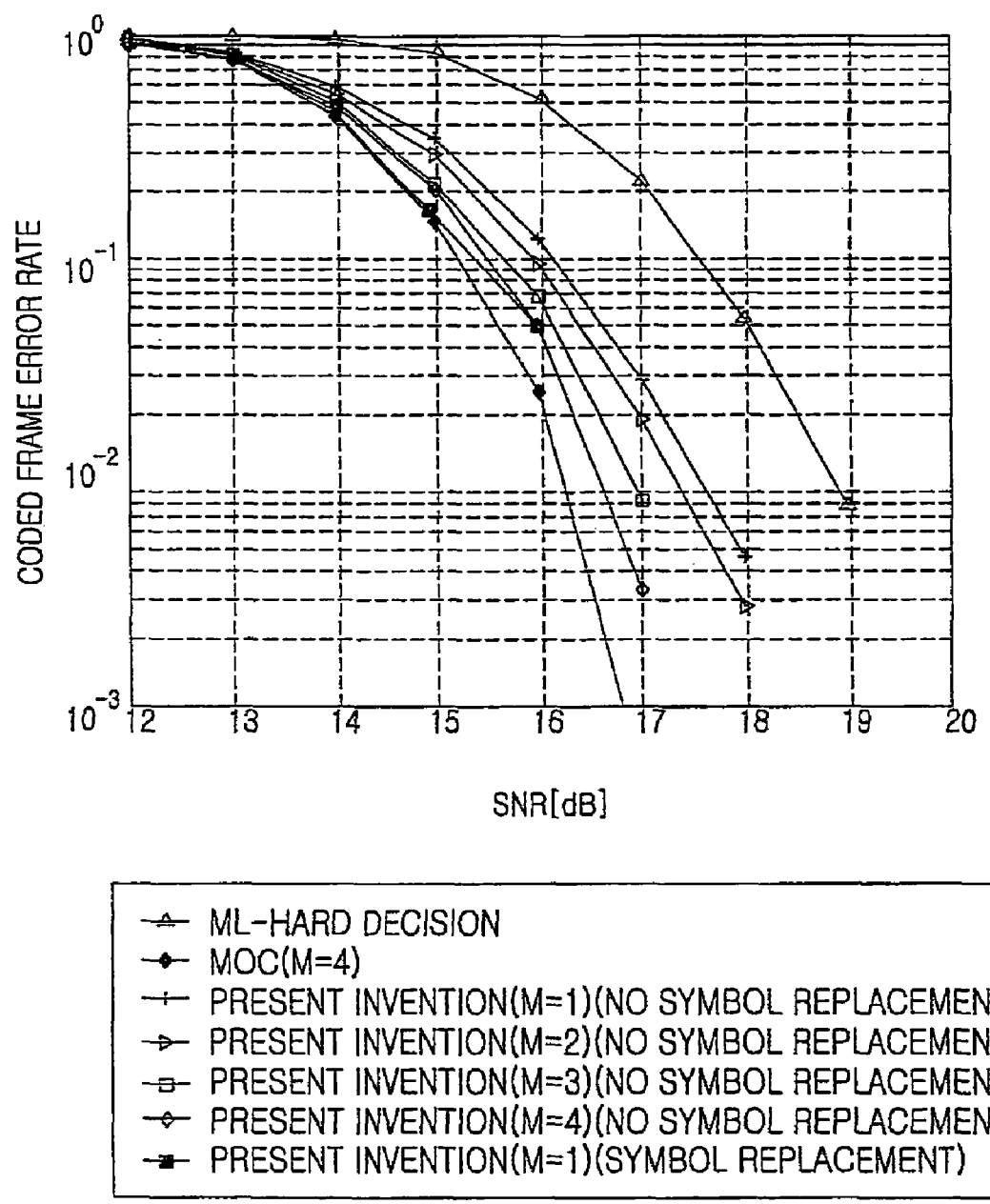
FIG. 11 illustrate a performance of exemplary embodiments of the present invention.

FIG. 11 illustrates a performance of exemplary embodiments of the present invention. Particularly, FIG. 11 illustrates coded frame error rate according to variation in signal to Noise Ratio (SNR) for the case that symbol replacement is not adopted, the case that symbol replacement is adopted, and the case that Maximum Likelihood (ML) is used with hard decision.

Referring to the FIG. 11, when the symbol replacement is not adopted, more candidates is selected at each phase, and the performance becomes higher. When the symbol replacement is adopted, the performance is almost the same as the performance under the case that 4 candidates are selected at each phase without symbol replacement.

Although the present disclosure has been described with an exemplary embodiment, various changes and modifications may be suggested to one skilled in the art. It is intended that the present disclosure encompasses such changes and modifications as falling within the scope of the appended claims.

What is claimed is:

1. An apparatus for a receiver comprising N-ary receive antennas in a Multiple-Input Multiple-Output (MIMO) wireless communication system, the receiver comprising:
a decomposer for decomposing a channel matrix to a matrix Q and a matrix R through a QR decomposition;
a detector for determining a candidate group of an n-th phase, estimating a plurality of transmit signal vectors by substituting a plurality of transmittable symbols into symbol combinations of a candidate group of a (n−1)-th phase as an n-th symbol and detecting (n+1)-th through N-th symbols using characteristics of the matrix R;
a calculator for calculating square Euclidean distance values between the transmit signal vectors and a receive signal vector; and
a determiner for determining the candidate group of the n-th phase by selecting transmit signal vectors having the smallest square Euclidean distance value among the transmit signal vectors.

2. The apparatus of claim 1, further comprising:
a limiter for limiting substitute symbols to be substituted into the symbol combinations of the candidate in each phase,
wherein the detector substitutes the substitute symbols limited by the limiter as an n-th symbol.

3. The apparatus of claim 2, wherein the limiter comprises:
a temporary estimator for temporarily estimating a transmit signal vector using a receive signal vector and the channel matrix; and
a selector for selecting substitute symbols to be substituted in each phase according to soft values of the temporarily estimated transmit signals.

4. The apparatus of claim 3, wherein the selector selects transmittable symbols in a square area centered at a point most adjacent to a soft value of the temporarily estimated n-th symbol amongst square areas covering a preset number of transmittable symbols in a constellation according to a modulation scheme of a transmit signal, as the substitute symbols of the n-th phase.

5. The apparatus of claim 3, wherein the temporary estimator temporarily estimates the transmit signal vector using a Zero Forcing (ZF) scheme or a Minimum Mean Square Error (MMSE) scheme.

6. The apparatus of claim 1, wherein the detector detects (n+1)-th through N-th symbols by performing the following computation for (N−n+1) times:

$$x_k = \text{slicer}\left(\frac{y'_k - \sum_{m=1}^{N-k+1} r_{(N-k+1),(N-m+1)} x_m}{r_{(N-k+1),(N-k+1)}}\right),$$

where $x_k$ denotes a k-th transmit symbol, slicer (.) denotes a slicing operator, $y'_k$ denotes a k-th receive signal of the receive signal vector multiplied by a matrix $Q^H$, and $r_{i,j}$ denotes an element in an i-th row and a j-th column of the matrix R.

7. The apparatus of claim 1, further comprising:
a replacer for replacing the symbols excluding the n-th symbol of the transmit signal vectors with symbols closer to the actual transmit signal when determining the candidate group of the n-th phase.

8. The apparatus of claim 7, wherein the replacer removes the component of the symbols excluding the target symbol to be replaced from the receive signal vector, and replaces the target symbol with another transmittable symbol to minimize the norm value of the subtraction of the component of the receive signal vector from which the component of the other symbols are removed and the component of the target symbol.

9. The apparatus of claim 8, wherein the replacer replaces the symbols based on the following equation:

$$x'_j = \text{slicer}\left(\frac{h_j^H}{\|h_j\|^2}\left(y' - \sum_{i=1, i\neq j}^{m} h_i x_i\right)\right),$$

wherein, $x'_n$ denotes the replaced symbol of the n-th symbol, S denotes the transmittable symbol set, y denotes the receive signal vector, m denotes the number of symbols, $h_j$ denotes the j-th column of the channel matrix, $x_n$ denotes the n-th transmit symbol, and slicer (•) denotes the slicing operator.

10. The apparatus of claim 8, wherein the replacer replaces the symbols based on the following equation:

$$x'_j = \text{slicer}\left(\frac{r_j^H}{\|r_j\|^2}\left(y' - \sum_{i=1,i\neq j}^{m} r_i x_i\right)\right),$$

wherein, $x'_j$ denotes the replaced symbol of the j-th symbol, y' denotes the vector acquired by multiplying the receive signal vector by the matrix Q acquired by QR-decomposing the channel matrix H, m denotes the number of symbols, $r_i$ denotes the i-th column of an upper triangle matrix acquired by QR-decomposing the channel matrix H, $x_i$ denotes the i-th transmit symbol, and slicer (•) denotes the slicing operator.

11. The apparatus of claim 1, further comprising:
a calculator for calculating a Log Likelihood Ratio (LLR) of each receive bit using the square Euclidean distance values.

12. The apparatus of claim 11, wherein, when square Euclidean distance values calculated in the n-th phase are provided, the calculator calculates per bit LLRs of the n-th symbol using the square Euclidean distance values calculated in the first through n-th phases, and updates per bit LLRs of the first through (n−1)-th symbols.

13. The apparatus of claim 12, wherein the calculator calculates the LLR based on the following equation:

$$LLR(b_{ti}) = \min_{x \in S_{t,i,0}} \|y - Hx\|^2 - \min_{x \in S_{t,i,1}} \|y - Hx\|^2$$

$$i = 1, 2, \ldots, m$$

$$S_{t,i,0} = \{x \mid b_{ti} = 0\}, \quad S_{t,i,1} = \{x \mid b_{ti} = 1\},$$

where LLR ($b_{ti}$) denotes an LLR of an i-th bit of a t-th symbol, x denotes a transmit signal vector, y denotes a receive signal vector, H denotes a channel matrix, m denotes the number of transmit antennas, $S_{t,i,0}$ denotes a transmit signal vector set where the i-th bit of the t-th symbol is 0, and $S_{t,i,1}$ denotes a transmit signal vector set where the i-th bit of the t-th symbol is 1.

14. The apparatus of claim 11, further comprising:
a decoder for calculating LLRs of receive bits using the square Euclidean distance values calculated in the N-th phase and performing a soft decision decoding using the LLRs.

15. The apparatus of claim 1, further comprising:
a decoder for constituting transmit signal vectors by substituting the plurality of the transmittable symbols into the candidate group of the (N−1)-th phase as an N-th symbol, and performing a hard decision using a transmit signal vector having the smallest square Euclidean distance value from the receive signal vector.

16. The apparatus of claim 1, further comprising:
an estimator for estimating the channel matrix; and
an arranger for arranging columns of the channel matrix according to a size of a norm value of each column of the channel matrix and providing the arranged columns to the decomposer.

17. A signal detecting method of a receiver which comprises N-ary receive antennas in a Multiple-Input Multiple-Output (MIMO) wireless communication system, the method comprising:
decomposing a channel matrix to a matrix Q and a matrix R through a QR decomposition;
determining a candidate group of an n-th phase by estimating a plurality of transmit signal vectors by substituting a plurality of transmittable symbols into symbol combinations of a candidate group of a (n−1)-th phase as an n-th symbol with respect to first through (n−1)-th symbols and detecting (n+1)-th through N-th symbols using characteristics of the matrix R;
calculating square Euclidean distance values between the transmit signal vectors and a receive signal vector; and
determining the candidate group of the n-th phase for the first through n-th symbols by selecting transmit signal vectors having the smallest square Euclidean distance value among the transmit signal vectors.

18. The signal detecting method of claim 17, further comprising:
limiting substitute symbols to be substituted into the symbol combinations of the candidate in each phase,
wherein the limited substitute symbols are substituted into symbol combinations of the candidate group of the (n−1)-th phase with respect to the first through (n−1)-th symbols, as an n-th symbol respectively.

19. The signal detecting method of claim 18, wherein limiting of the substitute symbols comprises:
temporarily estimating a transmit signal vector using a receive signal vector and the channel matrix; and
selecting substitute symbols to be substituted in each phase according to soft values of the temporarily estimated transmit signals.

20. The signal detecting method of claim 19, wherein selecting of the substitute symbols comprises selecting transmittable symbols in a square area centered at a point most adjacent to a soft value of the temporarily estimated n-th symbol amongst square areas covering a preset number of transmittable symbols in a constellation according to a modulation scheme of a transmit signal, as the substitute symbols of the n-th phase.

21. The signal detecting method of claim 19, wherein temporary estimating comprises adopting a Zero Forcing (ZF) scheme or a Minimum Mean Square Error (MMSE) scheme.

22. The signal detecting method of claim 17, wherein detecting of the (n+1)-th through N-th symbols using the characteristics of the matrix R comprises performing the following computation for (N−n+1) times:

$$x_k = \text{slicer}\left(\frac{y'_k - \sum_{m=1}^{N-k+1} r_{(N-k+1),(N-m+1)} x_m}{r_{(N-k+1),(N-k+1)}}\right),$$

where $x_k$ denotes a k-th transmit symbol, slicer (.) denotes a slicing operator, $y'_k$ denotes a k-th receive signal of the receive signal vector multiplied by a matrix $Q^H$, and $r_{i,j}$ denotes an element in a i-th row and a j-th column of the matrix R.

23. The signal detecting method of claim 17, further comprising:
replacing the symbols excluding the n-th symbol of the transmit signal vectors with symbols closer to the actual transmit signal after estimating a plurality of transmit signal vectors at the n-th phase.

24. The signal detecting method of claim 23, wherein replacing the symbols comprises: removing the component of the symbols excluding the target symbol to be replaced from the receive signal vector, and replacing the target symbol with another transmittable symbol to minimize the norm value of the subtraction of the component of the receive signal vector from which the component of the other symbols are removed and the component of the target symbol.

25. The signal detecting method of claim 24, wherein the symbols are replaced based on the following equation:

$$x'_j = \text{slicer}\left(\frac{h_j^H}{\|h_j\|^2}\left(y - \sum_{i=1, i \neq j}^{m} h_i x_i\right)\right),$$

wherein, $x'_n$ denotes the replaced symbol of the n-th symbol, S denotes the transmittable symbol set, y denotes the receive signal vector, m denotes the number of symbols, $h_j$ denotes the j-th column of the channel matrix, $x_n$ denotes the n-th transmit symbol, and slicer (•) denotes the slicing operator.

26. The signal detecting method of claim 24, wherein the symbols are replaced based on the following equation:

$$x'_j = \text{slicer}\left(\frac{r_j^H}{\|r_j\|^2}\left(y' - \sum_{i=1, i \neq j}^{m} r_i x_i\right)\right),$$

wherein, $x'_j$ denotes the replaced symbol of the j-th symbol, y' denotes the vector acquired by multiplying the receive signal vector by the matrix Q acquired by QR-decomposing the channel matrix H, m denotes the number of symbols, $r_i$ denotes the i-th column of an upper triangle matrix acquired by QR-decomposing the channel matrix H, $x_i$ denotes the i-th transmit symbol, and slicer (•) denotes the slicing operator.

27. The signal detecting method of claim 17, further comprising:
calculating a Log Likelihood Ratio (LLR) of each receive bit using the square Euclidean distance values.

28. The signal detecting method of claim 27, wherein calculating the LLR comprises:
when square Euclidean distance values calculated in the n-th phase are provided, calculating per bit LLRs of the n-th symbol using the square Euclidean distance values calculated in the first through n-th phase; and
updating per bit LLRs of the first through (n−1)-th symbols.

29. The signal detecting method of claim 28, wherein the LLR is calculated based on the following equation:

$$LLR(b_{ti}) = \min_{x \in S_{t,i,0}} \|y - Hx\|^2 - \min_{x \in S_{t,i,1}} \|y - Hx\|^2$$

$$i = 1, 2, \ldots, m$$

$$S_{t,i,0} = \{x \mid b_{ti} = 0\}, \quad S_{t,i,1} = \{x \mid b_{ti} = 1\},$$

where LLR ($b_{ti}$) denotes an LLR of an i-th bit of a t-th symbol, x denotes a transmit signal vector, y denotes a receive signal vector, H denotes a channel matrix, m denotes the number of transmit antennas, $S_{t,i,0}$ denotes a transmit signal vector set where the i-th bit of the t-th symbol is 0, and $S_{t,i,1}$ denotes a transmit signal vector set where the i-th bit of the t-th symbol is 1.

30. The signal detecting method of claim 27, further comprising:
calculating LLRs of receive bits using the square Euclidean distance values calculated in the N-th phase; and
performing a soft decision decoding using the LLRs.

31. The signal detecting method of claim 17, further comprising:
after determining a candidate group of the (N−1)-th phase, constituting transmit signal vectors by substituting the plurality of the transmittable symbols into the candidate group of the (N−1)-th phase as an N-th symbol; and
performing a hard decision using a transmit signal vector having the smallest square Euclidean distance value from the receive signal vector.

32. The signal detecting method of claim 17, further comprising:
estimating the channel matrix; and
arranging columns of the channel matrix according to a size of a norm value of each column of the channel matrix.

* * * * *